(12) United States Patent
Bates

(10) Patent No.: US 12,362,676 B2
(45) Date of Patent: Jul. 15, 2025

(54) FIXED FREQUENCY RESONANT INVERTER

(71) Applicant: Myrtle Holdings, LLC, Eden, UT (US)

(72) Inventor: L. Dexter Bates, Somerville, MA (US)

(73) Assignee: MYRTLE HOLDINGS, LLC, Eden, UT (US)

(*) Notice: Subject to any disclaimer, the term of this patent is extended or adjusted under 35 U.S.C. 154(b) by 0 days.

(21) Appl. No.: 18/668,595

(22) Filed: May 20, 2024

(65) Prior Publication Data

US 2025/0055382 A1    Feb. 13, 2025

Related U.S. Application Data

(60) Provisional application No. 63/531,344, filed on Aug. 8, 2023.

(51) Int. Cl.
| | | |
|---|---|---|
| *H02M 3/338* | (2006.01) | |
| *H02M 1/00* | (2006.01) | |
| *H02M 3/158* | (2006.01) | |

(52) U.S. Cl.
CPC ....... *H02M 3/3385* (2013.01); *H02M 1/0009* (2021.05); *H02M 1/0058* (2021.05); *H02M 3/1582* (2013.01)

(58) Field of Classification Search
CPC ............. H02M 3/3385; H02M 1/0009; H02M 1/0058; H02M 3/1582
See application file for complete search history.

(56) References Cited

U.S. PATENT DOCUMENTS

| | | | |
|---|---|---|---|
| 3,906,349 A | 9/1975 | Harrison | |
| 4,184,197 A | 1/1980 | Cuk et al. | |
| 5,701,243 A | 12/1997 | Youn et al. | |
| 6,341,076 B1 | 1/2002 | Kadatskyy et al. | |
| 6,658,748 B1 | 12/2003 | Leipold et al. | |
| 7,262,981 B2 * | 8/2007 | Stevanovic | H02M 3/156 363/132 |
| 8,717,782 B2 | 5/2014 | Huang | |
| 9,190,911 B2 | 11/2015 | Dai et al. | |
| 9,484,821 B2 | 11/2016 | Fu et al. | |
| 9,641,164 B2 | 5/2017 | Tohidian et al. | |

(Continued)

FOREIGN PATENT DOCUMENTS

| | | |
|---|---|---|
| CN | 103414463 | 11/2013 |
| GB | 2505278 | 2/2014 |

(Continued)

OTHER PUBLICATIONS

J. P. Gegner and C. Q. Lee, "Resonant current driven, nonresonant current coupled zero-voltage-switching converter," [1991] Proceedings of the 34th Midwest Symposium on Circuits and Systems, Monterey, CA, USA, 1991, pp. 727-730 vol.2, doi: 10.1109/MWSCAS.1991.252009.

(Continued)

*Primary Examiner* — Kyle J Moody

(74) *Attorney, Agent, or Firm* — Onello & Mello, LLP

(57) ABSTRACT

A self-oscillating electronic LC resonant inverter for use in fixed-frequency power converters, providing zero-current and zero-voltage soft switching. The inverter incorporates an active fixed-frequency series resonant current pump capable of pumping the tank circuit current up as well as down. The magnitude of the resonant current is controlled at the resonant frequency of the LC tank circuit.

17 Claims, 16 Drawing Sheets

(56) References Cited

U.S. PATENT DOCUMENTS

| | | |
|---|---|---|
| 9,755,627 B2 | 9/2017 | Andreani et al. |
| 10,917,001 B2 | 2/2021 | Telefus et al. |
| 2011/0299301 A1 | 12/2011 | Huang |
| 2011/0305044 A1 | 12/2011 | Huang |
| 2013/0021827 A1* | 1/2013 | Ye .......................... H03F 3/245 |
| | | 363/17 |
| 2014/0225439 A1* | 8/2014 | Mao ........................ H02J 50/12 |
| | | 307/31 |
| 2014/0254208 A1 | 9/2014 | Dai et al. |
| 2015/0124487 A1 | 5/2015 | Fu et al. |
| 2015/0372665 A1 | 12/2015 | Tohidian et al. |
| 2015/0381157 A1 | 12/2015 | Andreani et al. |
| 2019/0058389 A1 | 2/2019 | Telefus et al. |

FOREIGN PATENT DOCUMENTS

| | | |
|---|---|---|
| KR | 101812735 | 9/2017 |
| WO | 2025035041 | 2/2025 |

OTHER PUBLICATIONS

International Search Report and Written Opinion dated Oct. 1, 2024 issued in International Application No. PCT/US2024/041580.

* cited by examiner

FIG. 6A
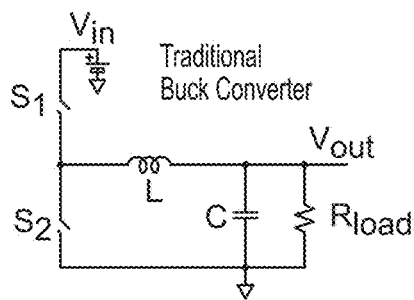
FIG. 6B
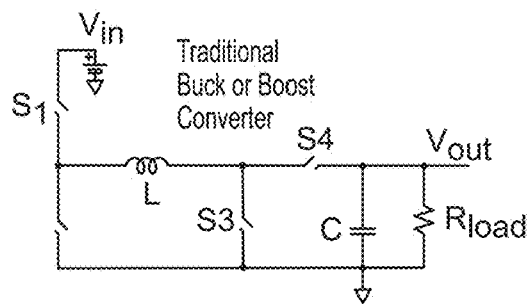
FIG. 6C
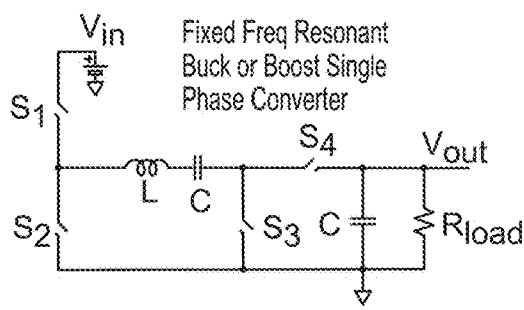
FIG. 6D
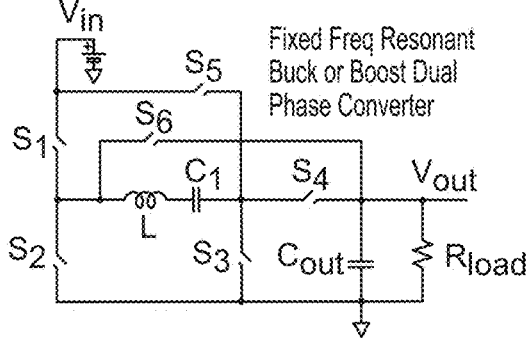
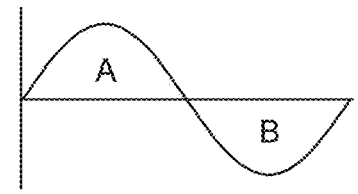
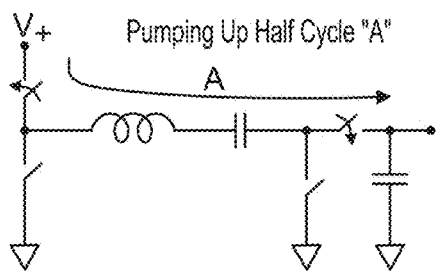
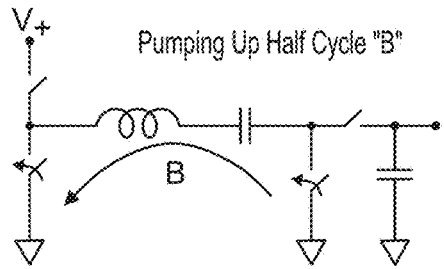
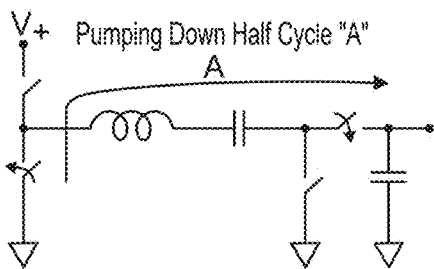
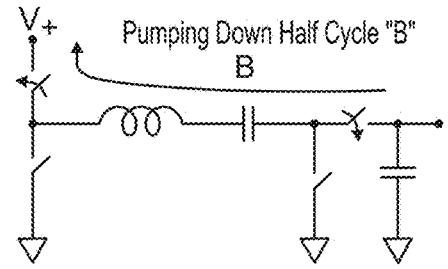
FIG. 7A

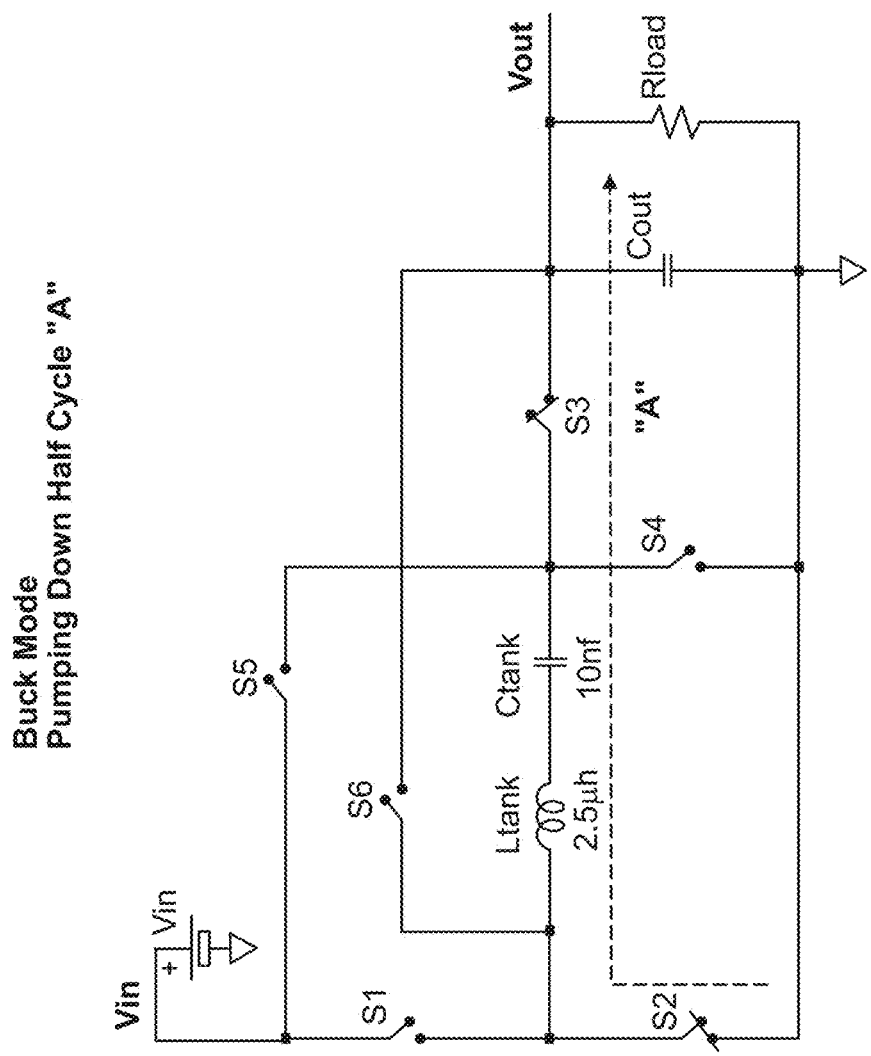
FIG. 10C
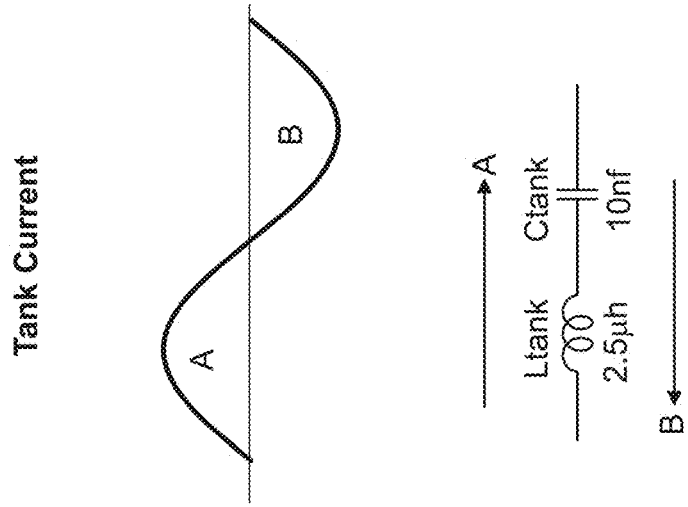

FIXED FREQUENCY RESONANT INVERTER

CROSS REFERENCE TO RELATED APPLICATIONS

The present application claims priority under 35 USC 119(e) to U.S. Provisional Patent Appl. No. 63/531,344, filed Aug. 8, 2023, the contents of which are incorporated herein in its entirety.

FIELD OF INTEREST

Inventive concepts relate to electrical power converters and, more particularly, to electronic switching power converters.

BACKGROUND

Electronic switching power converters are now in widespread use, and efforts have been made in recent years to improve their efficiency. The two primary sources of power loss in electronic power converters are switching loss and conduction loss.

Conduction loss in power converters results from the ohmic resistance of wires and switching transistors. Conduction losses in modern power converters have been reduced greatly with the availability of switching power transistors (such as MOSFETs) having very low channel resistance.

Switching loss in power converters results from the switching characteristics of the power transistors, including output capacitance and switching speeds. If a power transistor switches on when there is no voltage across it, then no power loss results during the switching transition, and this is called "zero-voltage switching". If no current is flowing through the power transistor at the transition time, then no power loss results during the switching transition, and this is called "zero-current switching". These two mechanisms, zero-voltage switching and zero-current switching, are the well-established primary components of what is referred to as "soft switching".

In the last several years the availability of MOSFET transistors with very low on-resistance has helped greatly to minimize power loss from conduction mechanisms. Switching power losses remain problematic.

SUMMARY

In accordance with principles of inventive concepts, a power converter, includes an input to receive power; an LC tank circuit; a switching circuit to switch power from the input to the LC tank circuit; and a feedback circuit to control the switching circuit to switch at the LC tank circuit's resonant frequency.

In accordance with principles of inventive concepts, a power converter includes feedback circuit configured to control switching according to the phase of the LC tank circuit's output.

In accordance with principles of inventive concepts, a power converter, includes a feedback circuit includes a secondary coil configured to sense the phase of the LC tank circuit.

In accordance with principles of inventive concepts, a power converter, includes a feedback circuit that is configured to produce zero voltage switching.

In accordance with principles of inventive concepts, a power converter, includes a feedback circuit that is configured to produce zero current switching.

In accordance with principles of inventive concepts, a power converter includes an inverting circuit.

In accordance with principles of inventive concepts, a power converter, is configured as a DC-to-DC converter.

In accordance with principles of inventive concepts, a power converter includes a secondary coil and is configured as a charger.

In accordance with principles of inventive concepts, a power converter is configured as a buck converter.

In accordance with principles of inventive concepts, a power converter is configured as a buck-boost converter.

In accordance with principles of inventive concepts, a power converter is configured as a bidirectional converter.

In accordance with principles of inventive concepts, a method of operating an electronic power converter includes providing an input power source to the converter; providing an LC tank circuit; providing a switching circuit to switch power from the input power source to the LC tank circuit; and providing a feedback circuit to control the switching circuit to switch power at the LC tank circuit's resonant frequency.

In accordance with principles of inventive concepts, a method of operating an electronic power converter includes a feedback circuit controlling switching according to the phase of the LC tank circuit's output.

In accordance with principles of inventive concepts, a method of operating an electronic power converter includes a feedback circuit including a secondary coil that senses the phase of the LC tank circuit.

In accordance with principles of inventive concepts, a method of operating an electronic power converter includes a feedback circuit that produces zero voltage switching.

In accordance with principles of inventive concepts, a method of operating an electronic power converter includes a feedback circuit produces zero current switching.

In accordance with principles of inventive concepts, a method of operating an electronic power converter includes a feedback circuit produces zero voltage and zero current switching.

In accordance with principles of inventive concepts, an electronic power converter includes an input to receive power; an LC tank circuit; a switching circuit to switch power from the input to the LC tank circuit; and a feedback circuit to control the switching circuit according to the phase of the LC tank circuit's output to switch at the LC tank circuit's resonant frequency and to produce zero voltage and zero current switching.

In accordance with principles of inventive concepts, an electronic power converter includes an inverting circuit configured to produce a DC output from the power converter.

In accordance with principles of inventive concepts an apparatus includes an LC tank circuit comprising an inductor and a capacitor connected in series; a switching circuit to drive the LC tank circuit; a feedback controller to sense a characteristic of the LC tank circuit and to drive the switching circuit; wherein the whole apparatus oscillates of its own accord at the natural frequency of the LC tank circuit.

In accordance with principles of inventive concepts an apparatus employs the characteristic of the LC tank circuit is the phase of the current flowing in the LC tank circuit.

In accordance with principles of inventive concepts a method includes driving a series resonant LC tank circuit with a switching circuit; and driving the switching circuit with a feedback controller adapted to sense the phase of the current flowing in the LC tank circuit; whereby the LC tank circuit, switching circuit, and feedback controller together oscillate as a composite at the natural frequency of the LC tank circuit.

In accordance with principles of inventive concepts an apparatus includes an LC tank circuit comprising an inductor and a capacitor connected in series; a switching circuit to drive the LC tank circuit; a feedback controller to drive the switching circuit; a feedback circuit to sense a characteristic of the LC tank circuit and to drive the switching circuit; wherein the LC tank circuit, switching circuit, and feedback controller together oscillate as a composite at the natural frequency of the LC tank circuit; and an output switching circuit to provide a direct current voltage output.

In accordance with principles of inventive concepts a method includes driving a series resonant LC tank circuit with a switching circuit; driving the switching circuit with a feedback controller adapted to sense the phase of the current flowing in the LC tank circuit; wherein the LC tank circuit, switching circuit, and feedback controller together oscillate as a composite at the natural frequency of the LC tank circuit; and driving an output switching circuit to provide a direct current output voltage.

In accordance with principles of inventive concepts an apparatus includes an LC tank circuit comprising an inductor and a capacitor connected in series; a switching circuit to drive the LC tank circuit; a feedback controller to drive the switching circuit; a feedback circuit to sense a characteristic of the LC tank circuit; wherein the LC tank circuit, switching circuit, and feedback controller together oscillate as a composite at the natural frequency of the LC tank circuit; and an interface configured to drive a secondary coil and rectification circuit to charge a power source.

In accordance with principles of inventive concepts a method includes driving a series resonant LC tank circuit with a switching circuit; driving the switching circuit with a feedback controller adapted to sense the phase of the current flowing in LC tank circuit; wherein the LC tank circuit, switching circuit, and feedback controller together oscillate as a composite at the natural frequency of the LC tank circuit; and driving a secondary coil and rectification circuit to charge a power source.

In accordance with principles of inventive concepts a method includes the amplitude of the oscillation in the LC tank circuit can be pumped up or down by the feedback controller.

In accordance with principles of inventive concepts a method includes the amplitude of the oscillation in the LC tank circuit can be pumped up or down by the feedback controller.

In accordance with principles of inventive concepts an apparatus includes a feedback controller that drives the switching circuit to facilitate zero-current switching or zero-voltage switching or both.

In accordance with principles of inventive concepts a method includes the feedback controller drives the switching circuit to facilitate zero-current switching or zero-voltage switching or both.

In accordance with principles of inventive concepts an apparatus includes a feedback controller that drives the switching circuit to facilitate zero-current switching or zero-voltage switching or both.

In accordance with principles of inventive concepts a method includes a feedback controller that drives the switching circuit to facilitate zero-current switching or zero-voltage switching or both.

In accordance with principles of inventive concepts an apparatus is capable of providing power flow in either direction between the DC source and the DC load.

In accordance with principles of inventive concepts a method includes providing power flow in either direction between the DC source and the DC load.

In accordance with principles of inventive concepts a method includes driving a series resonant LC tank circuit with a switching circuit; and driving the switching circuit with a feedback controller adapted to sense a characteristic of the LC tank circuit; whereby the LC tank circuit, switching circuit, and feedback controller together oscillate as a composite at the natural frequency of the LC tank circuit.

In accordance with principles of inventive concepts an apparatus includes a feedback controller comprises a current sensing circuit comprising a secondary winding on the inductor together with an integrator.

In accordance with principles of inventive concepts a method includes the phase of the current flowing in the LC tank circuit is produced by way of a secondary winding on the inductor together with an integrator.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 2E shows the capacitor voltage pumping up with successive edge transitions of the input voltage waveform;

FIG. 6A-6D are idealized circuit diagrams of conventional and inventive power converters;

FIG. 7A-7C illustrate current and voltage flows of the idealized circuits of FIG. 6A-6D;

FIGS. 10A, 10B, 10C, and 10D depict power path flow diagrams for the six-transistor dual-phase resonant fixed frequency buck converter of FIGS. 6D and 8;

DETAILED DESCRIPTION OF PREFERRED EMBODIMENTS

Figure 1:
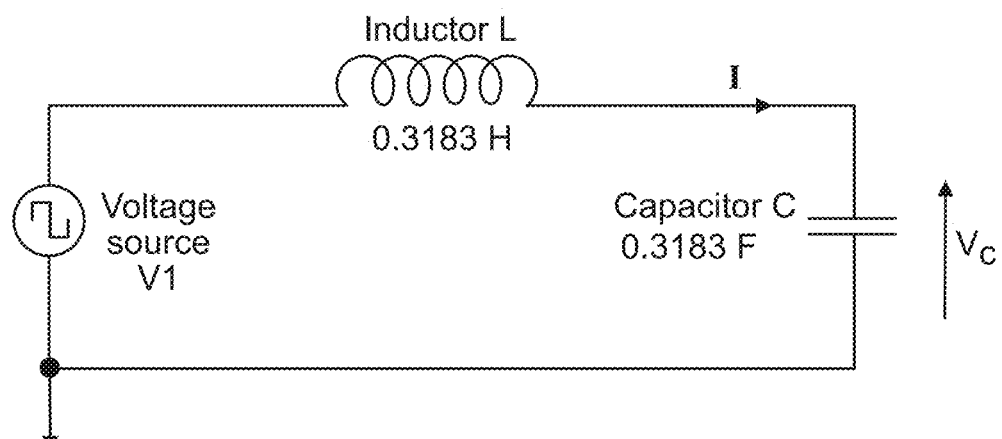
FIG. 1 is a circuit diagram of an LC tank circuit such as may be employed in a power converter in accordance with principles of inventive concepts.

Various aspects of the inventive concepts will be described more fully hereinafter with reference to the accompanying drawings, in which some example embodiments are shown. The present inventive concept may, however, be embodied in many different forms and should not be construed as limited to the example embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

A resonant tank circuit consists of an inductor (L) connected electrically in series with a capacitor (C). Resonant tank circuits provide performance benefits in certain applications within the field of power electronics. For example, the efficient production of a sinusoidal waveform can be obtained using a resonant tank circuit pumped in a suitable manner from a source of DC power via switching transistors. Similarly, DC-DC power conversion can be carried out using a resonant tank circuit pumped in a suitable manner from a source of DC power via switching transistors.

Whether AC or DC power is being produced, control of the magnitude of the resulting waveform is usually required. In prior-art systems employing tank circuits, magnitude control has been achieved by the use of a variable drive frequency. Such an approach incurs undesirable power losses resulting from the necessity to turn the switching transistors on and off at times when the current and/or voltage waveforms are non-zero. A system and method in accordance with principles of inventive concepts provide a method for pumping a resonant tank circuit in such a manner that such switching losses are avoided, while, at the same time, providing control of the magnitude of the resulting waveform. In addition, a system and method in accordance with principles of inventive concepts provides the further advantage of producing such a waveform at a fixed, or quasi-fixed, frequency.

A system and method in accordance with principles of inventive concepts employs power switches and resonant circuits to yield zero-voltage and zero-current switching in power converters. It is known that if a series LC network (series resonant tank) is driven with an uncorrelated square wave voltage source at roughly the resonant frequency of the tank, a sinusoidal current will develop in the tank at the resonant frequency of the tank. To control the magnitude of power delivered, prior-art resonant power converters (for example, the LLC converter described in "NCL30159AA LLC Power Converter Controller datasheet, onsemi Publication Order Number NCL30159/D, Semiconductor Components Industries LLC, June 2023") have been variable-frequency designs operating at frequencies "off-resonance" as a method of controlling the level of the resonant energy in the tank, with concomitant undesirable power losses resulting from switching the transistors on and off at times when the current and/or voltage waveforms are non-zero. In example embodiments a system in accordance with principles of inventive concepts provides an active, non-dissipating method for controlling the level of resonating tank current while providing operation at the resonant frequency of the tank.

In example embodiments a power converter in accordance with principles of inventive concepts may be an inverter that includes a series resonant LC circuit, a modified square wave voltage source that drives the series resonant tank circuit, and a feedback controller that provides appropriate transition timing and polarity for the driving source (that is, the modified square wave voltage source). In example inverter embodiments a series LC network is driven by a modified square-wave voltage source that is controlled by a feedback controller. The frequency and phase of the voltage source are derived from the zero-crossings of the tank current waveform, ensuring that the square-wave input to the tank circuit always operates at the resonant frequency of the tank and switches at the zero-crossings of the current in the tank.

A series LC resonant circuit may be referred to herein as a series resonant tank, or, simply, as a tank circuit. In example embodiments a modified square wave voltage source employs a half-bridge to drive the series resonant tank circuit. The half-bridge may include an upper transistor driver and a lower transistor driver that alternately switch on and off delivering, on a half-cycle-by-half-cycle basis, either the supply voltage or the zero ("ground") voltage level to the tank circuit. In example embodiments, the transistors may be power MOSFETs or other suitable types, such as insulated gate bipolar transistors (IGBTs). In example embodiments the feedback controller uses the zero-crossings of the current waveform to generate appropriate transition timing and polarity for the driving source waveform.

In example embodiments a feedback controller responds to the instantaneous values of the inductor current and capacitor voltage, not to an independent oscillator. The feedback controller ensures that the entire system (comprising series resonant tank, power switches, and feedback controller) oscillates at the natural frequency of the LC resonant circuit. Conventional self-oscillating DC-DC converters do not incorporate a resonant LC tank circuit as a primary power-handling component (see, for example, Chapter 1 of Power Conversion in Electrical Networks, Jonathan R. Wood, Ph.D. thesis, Massachusetts Institute of Technology, Cambridge, Massachusetts, June 1973). In addition, such power converters typically exhibit aperiodic ("chaotic") behavior (see, for example, Chaos: A Real Phenomenon in Power Electronics, Jonathan R. Wood, Proceedings of the Fourth Annual IEEE Applied Power Electronics Conference, March 1989. IEEE Catalogue Number 89CH2719). A power converter in accordance with principles of inventive concepts behaves with a predictable periodic waveform with an operating frequency that is the natural resonant frequency of the LC tank circuit.

In example embodiments the system can pump both up (to give increasing tank current) and down (to give decreasing tank current). To do this, the feedback controller monitors the tank current to lock both the frequency and phase of the driving voltage waveform to the current waveform of the tank. In this manner, the driving source always operates at the resonant frequency of the tank, with transition timings derived from the zero-crossings of the current waveform. The input voltage source is switched, or not, at the zero-crossings of the current waveform, thereby facilitating zero-current soft-switching. In addition, with regard to the second component of soft switching, zero voltage switching, the tank inductor current drives the switching node to the other stop (i.e., high or low), thereby facilitating zero-voltage switching. Thus, both when pumping up and when pumping down, the inductor current drives the switching node. Whichever transistor is off switches on when the inductor current has driven the switching node voltage to the same value as the driving source voltage (high or low), thereby providing zero-voltage switching.

In example embodiments a feedback controller determines the timing of the edges of the input square-wave and those edges are set to coincide with the zero crossings of the tank current waveform. The component values of a tank circuit can drift with temperature and with aging and, as a result, simply calculating the (nominal) resonant frequency of the tank circuit and attempting to drive the circuit with a square wave of that calculated frequency would not yield a system that operates at the tank circuit's actual resonant frequency. Employing a feedback controller in accordance with principles of inventive concepts compensates for any drift and ensures that the circuit operates at the tank circuit's actual resonant frequency.

In example embodiments, a current pump in accordance with the present invention employs a feedback controller to increase or decrease the resonant tank current based on waveform timing, thereby to keep the tank current within prescribed bounds. To hold the tank current within a prescribed range, the feedback controller may employ a summing amplifier that accepts a feedback voltage representing the instantaneous tank current together with a reference voltage representing the desired tank current.

A feedback-controlled tank circuit in accordance with principles of inventive concept may be employed in a variety of electronic power application, including inverters and DC-DC converters, but for clarity and brevity of description inventive concepts will be described primarily as related to example embodiments of inverters. DC-DC converter applications in accordance with principles of inventive concepts may include wireless power transfer converters (e.g., electric vehicle wireless battery chargers), switching voltage regulators having both sink and source capability, and buck/boost converters having both sink and source capability. DC-DC converters having both sink and source capability are sometimes referred to as "bidirectional" converters, in which power can be transferred from the primary DC source to a DC load, or vice versa. Inventive concepts may also be applied to resonant mechanical actuators.

A system and method in accordance with principles of inventive concepts provides an active non-dissipative method for controlling (both up and down) the level of circulating current in a series resonant LC circuit operating at the resonant frequency. Conventional methods for reducing the current in a resonant circuit have been dissipative in nature.

In example embodiments a system and method facilitate both zero-current and zero-voltage soft switching for power converters by operating at the resonant frequency. Switching power loss in any power converter is lessened if the converter employs either zero-current or zero-voltage switching. Conventional power converters do not offer both low-loss mechanisms, and some converter topologies offer neither of them. For example, an LLC resonant power converter adjusts the frequency of a driving voltage square wave to control the level of oscillating energy in a resonant tank, but, because of its operation off-resonance, such a converter cannot easily achieve both zero-voltage and zero-current soft switching. By operating at the resonance frequency of the tank, a power converter in accordance with principles of inventive concepts can achieve either or both zero-voltage soft switching and zero-current soft switching.

A system and method in accordance with principles of inventive concepts provides the maximum operating energy for power transfer in an LC series resonant power converter by operating at the resonant frequency. In any resonant tank circuit, the magnitude response of the resonant circuit increases substantially as the frequency of operation approaches the natural resonant frequency of the tank. Operating off-resonance results in greatly decreased energy circulation within the tank. Theoretically, the response of a lossless LC circuit at resonance is infinite, but real component impedances provide practical limits. When operated at its resonant frequency in accordance with principles of inventive concepts, an LC circuit provides the maximum operating energy available for power transfer.

An example embodiment of a series-resonant LC circuit, such as may be employed in a power converter in accordance with principles of inventive concepts is illustrated in the circuit diagram of FIG. 1 The circuit includes inductor L and capacitor C. The LC circuit is driven from a square-wave voltage source V1. The voltage produced across capacitor C is Vc, and the current flowing is I. In this example the value of inductor L is 0.3183 H (henry), and the value of capacitor C is 0.3183 F (farad). It will be understood that these values are chosen for illustrative purposes only.

Figure 2A:
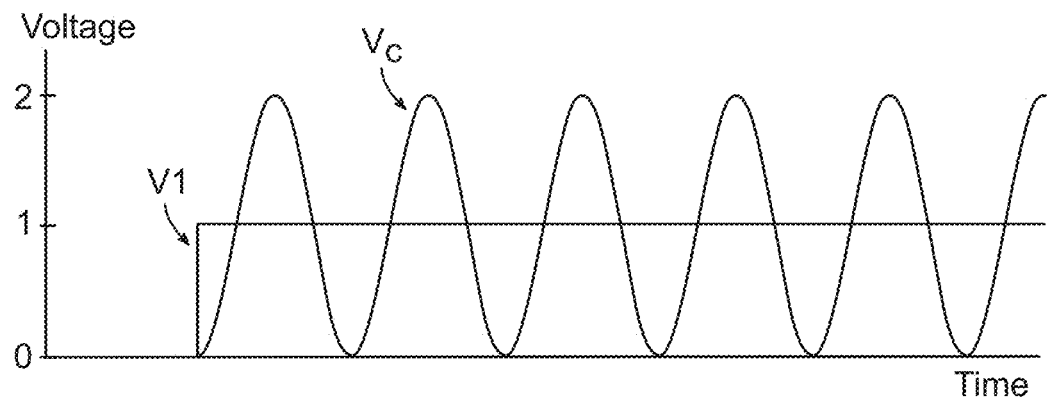
FIG. 2A is a plot of voltage vs time illustrating the response of an LC resonant circuit to a one-volt step input.

FIG. 2A illustrates the behavior of the circuit of FIG. 1 in response to a one-volt step input at V1. Even though the input voltage applied across the series LC network is a discontinuous step function, both the resulting voltage across the capacitor and the current through the capacitor, and consequently the current in the tank itself, will be sinusoidal. Accordingly, in response to the one-volt step input, the voltage across the capacitor, initially starting at zero will rise up to a value of two volts, with the shape of an inverted half-wave cosine function. The voltage will then fall back to its starting value of 0V, thereby tracing out one cycle of a 360-degree sinusoidal waveform (−90 degrees to −270 degrees). The oscillation will then continue. As long as the one-volt level is held constant across the series LC network, the capacitor voltage waveform will be a sine wave oscillating back and forth between 0V (the valley) and +2V (the peak), with magnitude 2 V peak-to-peak. The inductor current I will also be a sinusoid, the amplitude of which is dependent upon the amplitude of the input step waveform and the circuit component values. The frequency of the oscillation will be Fc=1/(2*pi*SqRoot (L*C)), which for this illustration is 0.5 Hz, corresponding to a period of 2 seconds.

Figure 2B:
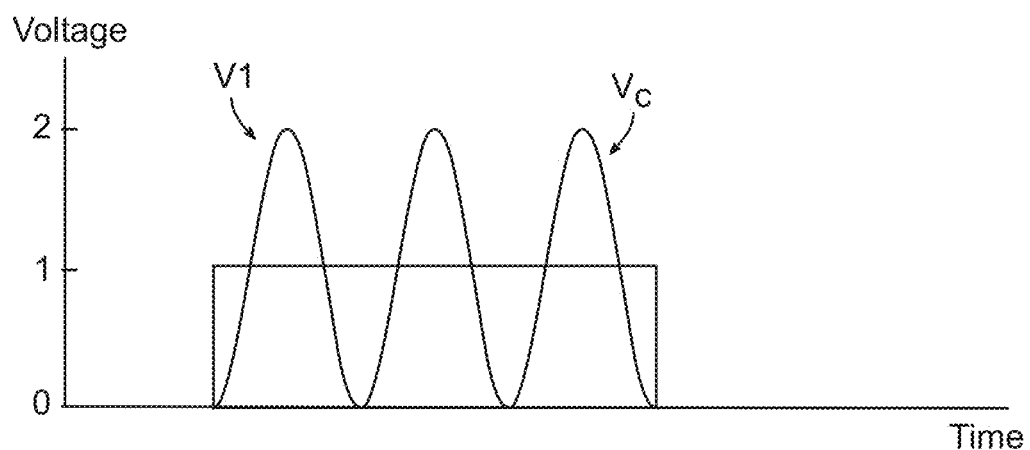
FIG. 2B is a plot of voltage vs time of a resonant circuit's output voltage when driven by a precisely timed input voltage to terminate oscillation.

In the example of FIG. 2B the input voltage V1 is pulled down to zero at the exact time that the voltage Vc across capacitor C is zero and the current I through inductor L is zero. This terminates the tank's oscillation, as illustrated by the zero value of the capacitor's voltage Vc going forward from this point in time.

To start the oscillation in the tank, a positive transition of the voltage across the circuit was used, and to stop the oscillation a timely negative transition of the input was used. In example embodiments a system and method in accordance with principles of inventive concepts employs a precisely timed control of an input voltage's edges to yield control of a resonant tank's voltage.

Figure 2C:
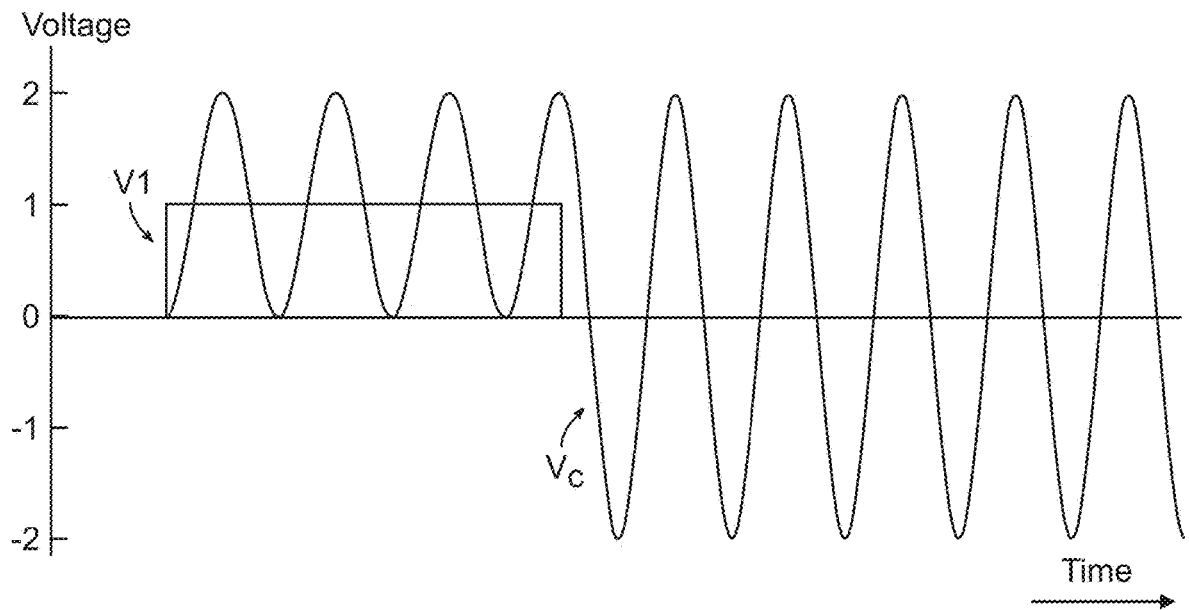
FIG. 2C is a plot of voltage vs time of a resonant circuit's output voltage when driven by a precisely timed input voltage to double the amplitude of the circuit's oscillation.

In the example embodiment of FIG. 2C the input voltage is brought low precisely at the peak of the capacitor voltage waveform, resulting in a doubling of the magnitude of the oscillating voltage across the capacitor to 4 V peak-to-peak.

Figure 2D:
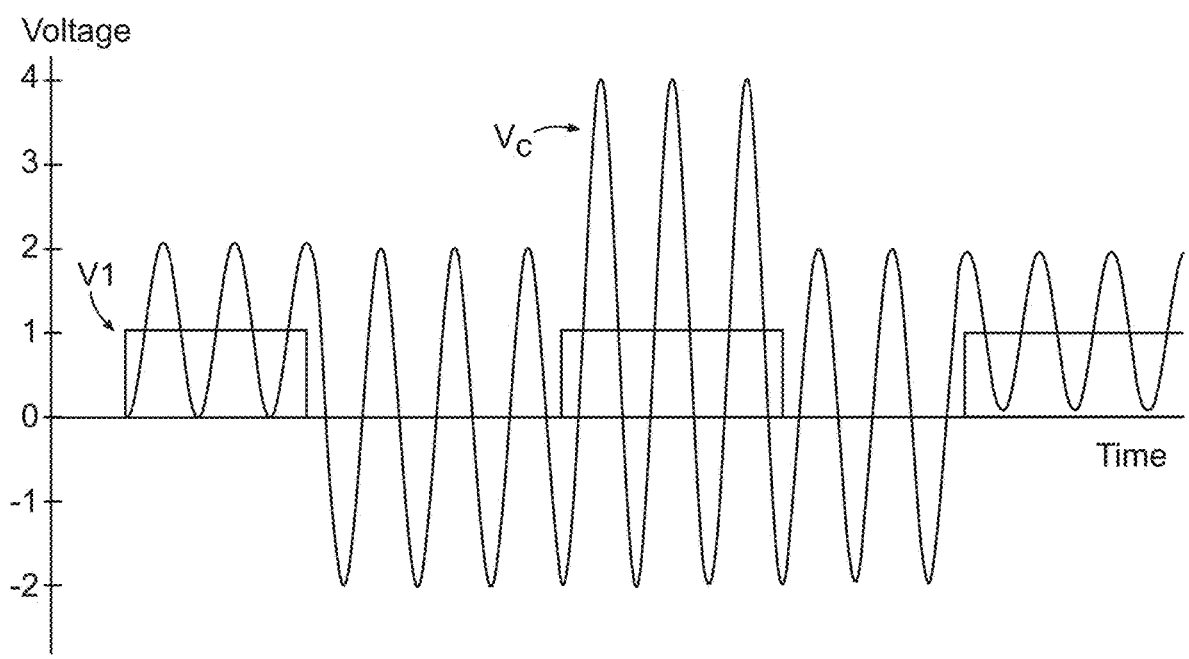
FIG. 2D is a plot of voltage vs time of a resonant circuit's output voltage when driven by a series of precisely timed input voltages to control the amplitude of the circuit's oscillation.

In the example embodiment of FIG. 2D a succession of input voltage edge transitions, precisely timed to correspond with the peaks and the valleys of the capacitor voltage waveform, control the magnitude of the oscillating capacitor voltage, both up and down, as illustrated.

In example embodiments in accordance with principles of inventive concepts, the timing of the edges of an input square wave may be used to make the steady state resonating sinusoidal current and voltage in the tank either increase or decrease. After the transition of either a positive edge or a negative edge of the input, the steady state tank current will increase or decrease, depending on direction of the edge transition and whether the edge happened at the peak of the tank capacitor voltage waveform or at the valley.

Table 1 summarizes the effect of four possible cases of input voltage edge direction (positive or negative) and capacitor voltage (peak or valley), which may be employed by a system and method in accordance with principles of inventive concepts to control the output of a tank circuit.

TABLE 1

Tank Current Increase or Decrease vs Input Edge Timing

| Vc (peak or valley) | Vin Edge Direction | Tank Current Response |
|---|---|---|
| Valley | Pos | Increases |
| Valley | Neg | Decreases |
| Peak | Neg | Increases |
| Peak | Pos | Decreases | where:
   Vc refers to the capacitor voltage,
   Valley refers to the negative-most point of the capacitor's sinusoidal voltage waveform,
   Peak refers to the positive-most point of the capacitor's sinusoidal voltage waveform,
   Pos refers to the positive edge of the input voltage waveform,
   Neg refers to the negative edge of the input voltage waveform.

Figure 2E:
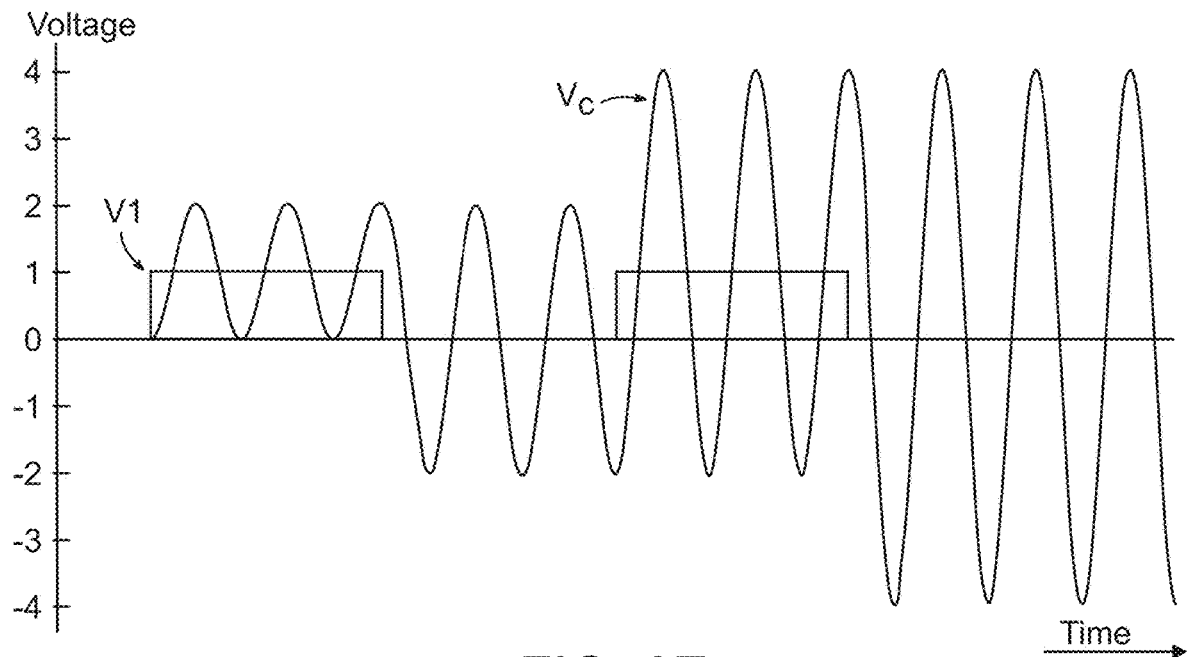
FIG. 2E is

FIG. 2E shows the capacitor voltage pumping up with successive edge transitions of the input voltage waveform.

Figure 2F:
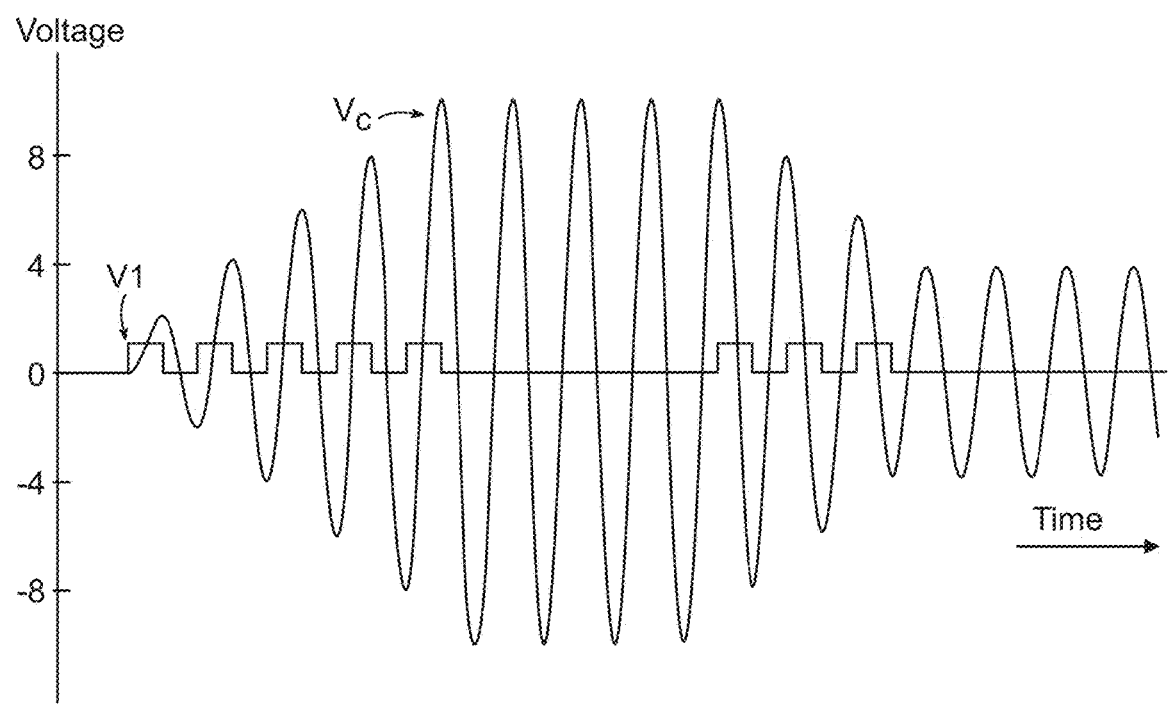
FIG. 2F shows the pump operating both up and down.

FIG. 2F shows the pump operating both up and down. The tank capacitor voltage either increases or decreases, depending on the polarity of the edge of the voltage input and whether the edge occurs at the peak or valley of the current waveform. With regard to the periods of inactivity between input pulse bursts, as long as the input voltage remains steady the output will remain steady, hence the periods of inactivity between pulse edge bursts.

Figure 2G:
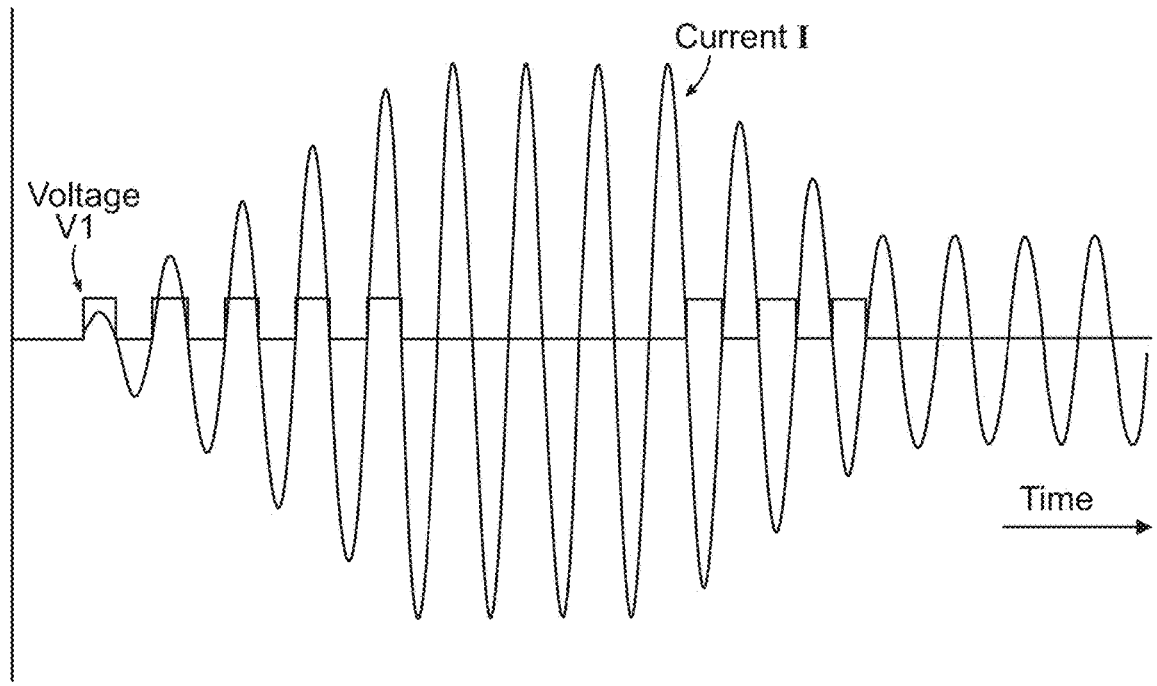
FIG. 2G shows the waveform of the tank current with regard to edge transitions of the input square-wave as the tank current is pumped up then down.

FIG. 2G shows the waveform of the tank current with regard to edge transitions of the input square-wave as the tank current is pumped up then down. The input edges occur at the zero-crossings of the current waveform. Table 1 above illustrates how the polarity of the square-wave input relative to the polarity of the current affects the increase and decrease of the circulating current.

In an LC resonant tank with a sinusoidal capacitor voltage waveform the current waveform will also be sinusoidal but shifted in time (phase) by 90 degrees from the voltage waveform. This means that the peak and valley points of the voltage waveform occur at the zero-crossings of the current waveform. Since the edge timing of the input voltage source occurs at the peak and valley of the voltage waveform, that same edge will occur at the zero-crossing of the current waveform. This is called "zero-current" switching, which is an efficient power transfer mechanism and acts to reduce power dissipation during the switching transitions of the power transistors. (Since power is voltage times current, if the current is zero then the power is zero.)

Figure 3:
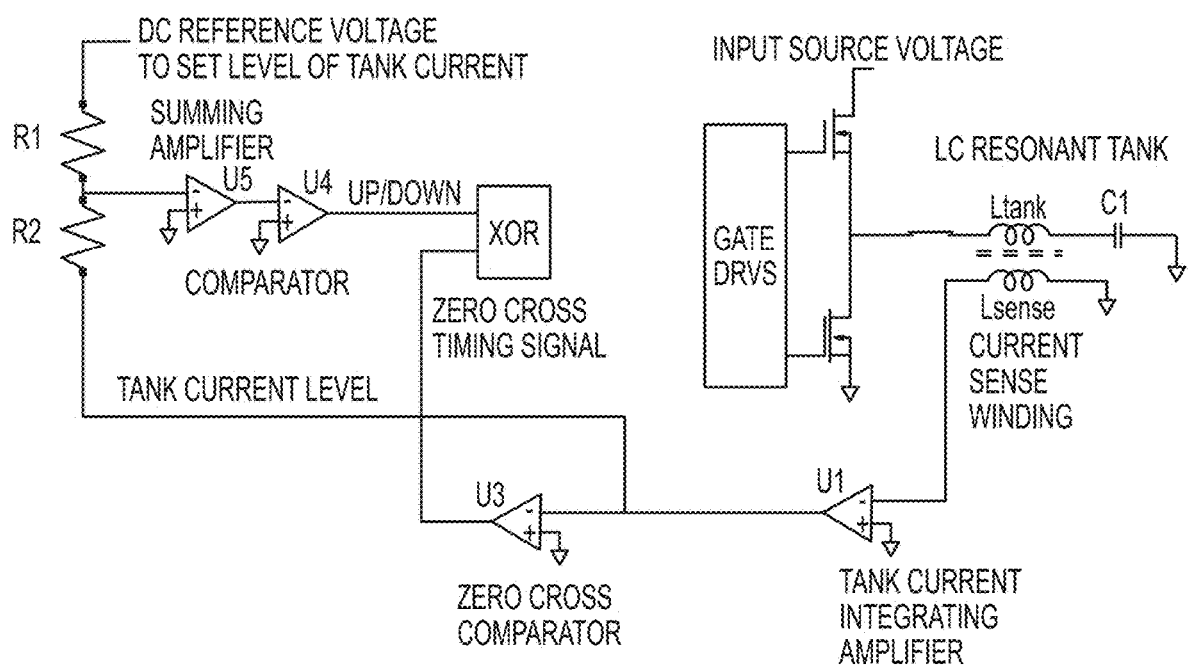
FIG. 3 is a schematic diagram of an example embodiment of a resonant pump inverter in accordance with principles of inventive concepts.

FIG. 3 is a schematic diagram of an example embodiment of a resonant pump inverter in accordance with principles of inventive concepts. MOSFETs M_top and M_bottom form a half-bridge that drives the series LC resonant tank. A small current sense winding, L_sense, develops a sinusoidal voltage Vsense that is in phase with the voltage across the tank inductor, L_tank. Voltage Vsense "leads" the tank current waveform by 90 degrees.

Voltage Vsense is fed into an integrating amplifier U1, which shifts the waveform by approximately ninety degrees, yielding a sinusoidal output that is in phase with the tank current waveform. The zero crossing of the sinusoidal output of the current integrating amplifier U1 occurs at the same time as the zero crossing of the sinusoidal current in the tank circuit.

The output of the tank current integrating amplifier U1 is fed to a zero-crossing comparator U3, the output of which transitions at the zero crossing of the current waveform, thereby forming a timing signal for the half-bridge MOSFETs M_top and M_bottom.

In example embodiments the output current may be increased or decreased, in order to adjust for load variations for example, using feedback from the tank current integrating amplifier U1. The output of integrating amplifier U1 is summed with a level-setting reference voltage (which sets the desired tank current level) through resistors R2 and R1 to summing amplifier U5. The output of summing amplifier U5 is fed to comparator U4. The output of comparator U4 provides an UP/DOWN control signal that increases or decreases the current output of the resonant pump inverter.

In operation, when the UP/DOWN signal is high (when the pump current is to increase), the timing signal will pass through the exclusive-or block (XOR) to drive the gate drivers, which drive the half-bridge MOSFETs M_top and M_bottom. When the UP/DOWN signal is low (when the pump current is to decrease), the timing signal will be inverted by the exclusive-or block (XOR) before passing to the gate drivers, which drive the half-bridge MOSFETs M_top and M_bottom.

As previously described, non-inversion or inversion of the timing signal yields, respectively, increased or decreased current magnitude in the tank circuit. Using the appropriate switch timing in accordance with principles of inventive concepts, the half-bridge MOSFETs M_top and M_bottom will switch at times when there is zero voltage across the MOSFET being switched, there is zero current through the inductor L_tank, and the voltage across the tank capacitor C_tank is at a maximum or minimum. In accordance with principles of inventive concepts, this mode of operation provides increased efficiency and reduced stress on the half-bridge MOSFETs.

Figure 4:
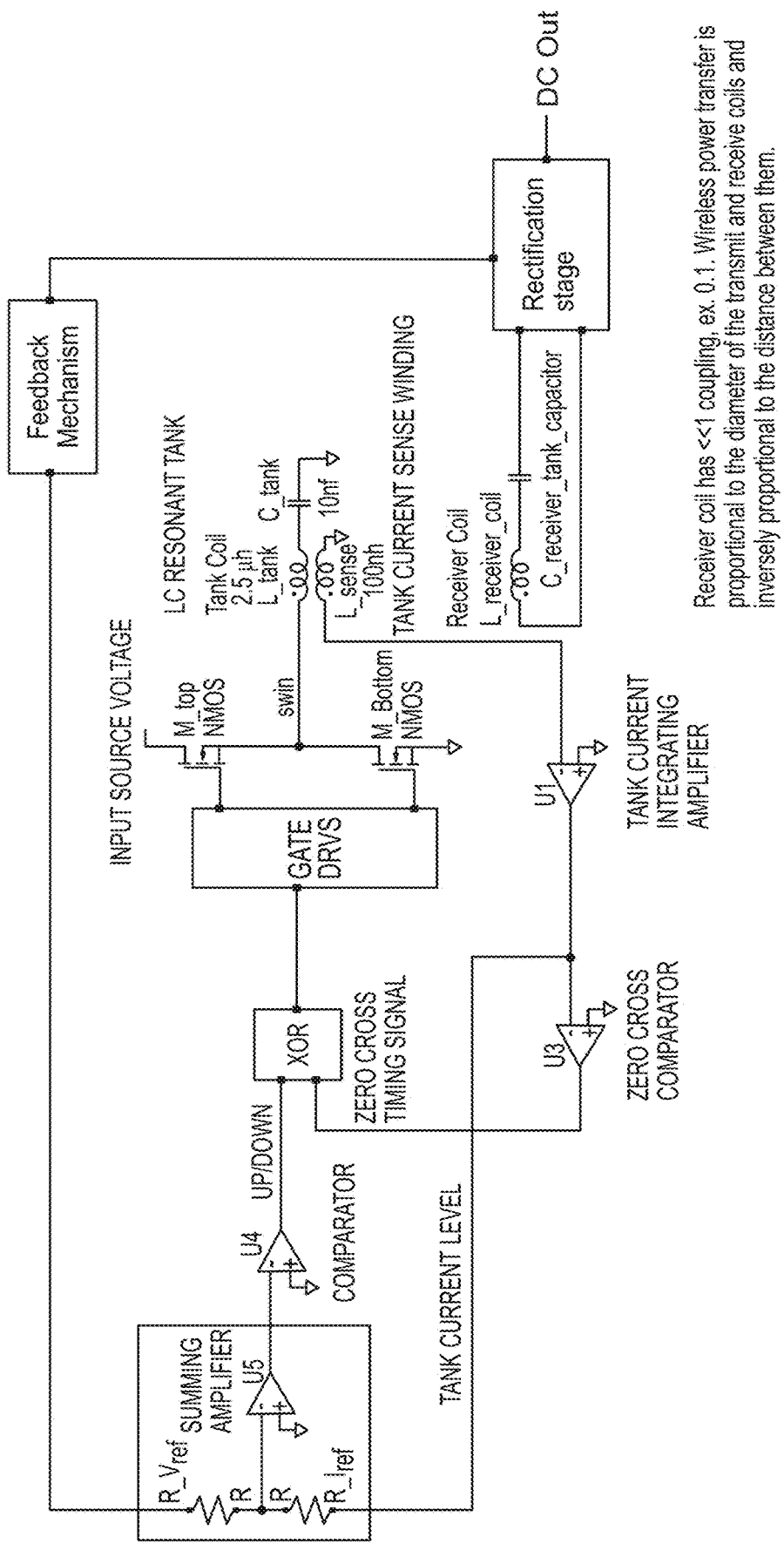
FIG. 4 is a schematic diagram of an example embodiment of a wireless charger system employing a resonant current pump, in accordance with principles of the present invention.

FIG. 4 is a schematic diagram of an example embodiment of a wireless charging system in accordance with principles of inventive concepts. The system employs a resonant current pump, in accordance with principles of inventive concepts, such as that described in the discussion related to FIG. 3. The receiving coil, rectification stage and a feedback mechanism that feeds charging information back into the summing amplifier of the current pump may be located in the device to be charged, such as a vehicle or portable electronic device, for example. The receiving device regulates delivered power using a feedback mechanism, such as sensing back, or counter, electromotive force (EMF) from the receiving coil (as in the Qi Wireless Power Consortium charging standard at www.wirelesspowerconsortium.com), or a Wi-Fi or near-field Wi-Fi communication channel from the receiver back to the transmitter. As indicated in the schematic, the feedback mechanism derives a feedback signal from the rectification stage of the DC output and feeds that signal to the summing amplifier U5 to set the level of the tank circuit.

Figure 5:
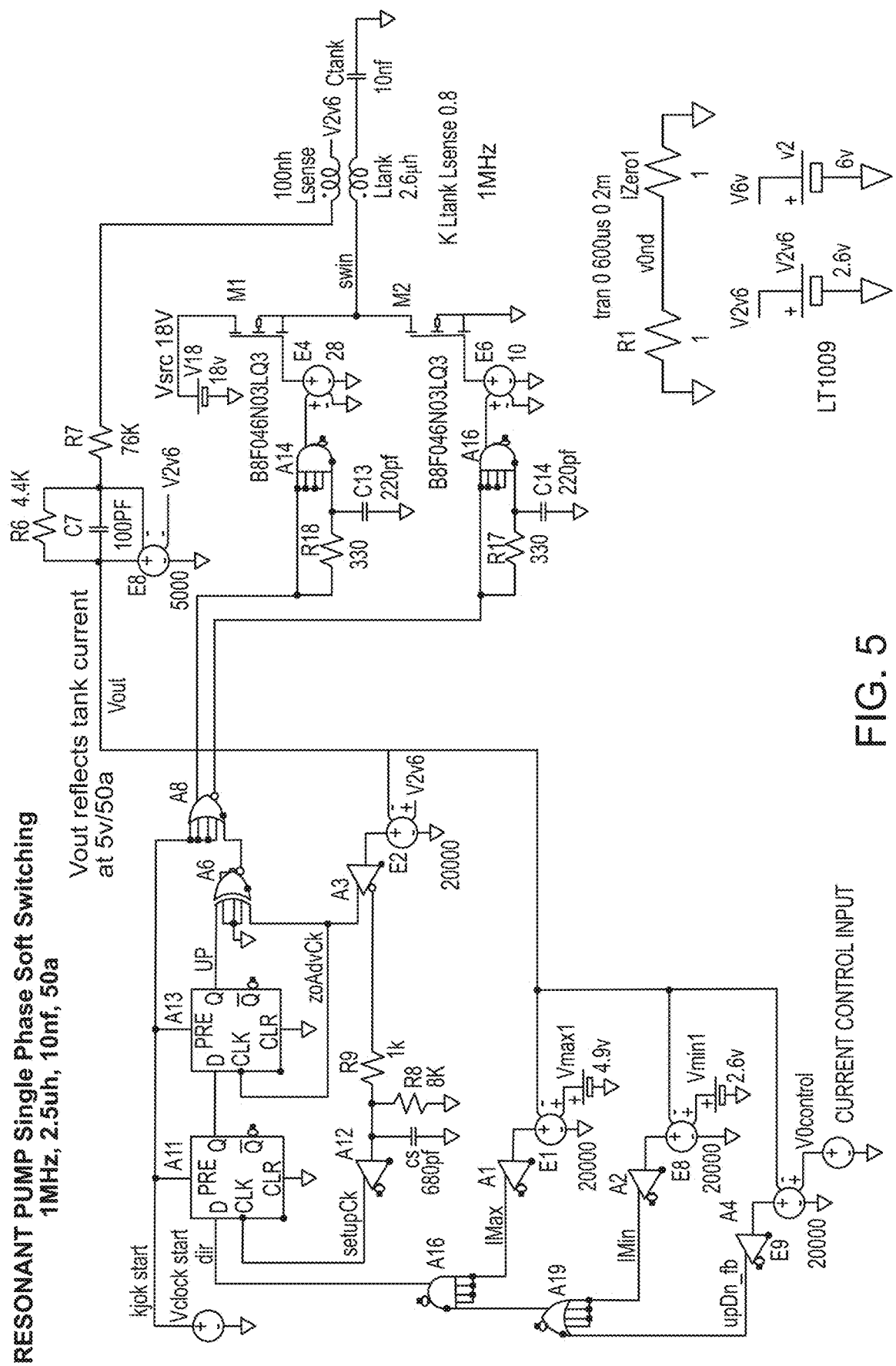
FIG. 5 is a more detailed circuit diagram of a resonant current pump in accordance with principles of the present invention.

FIG. 5 is a more detailed circuit diagram of a resonant current pump in accordance with principles of the present invention. Such an embodiment may be employed in a resonant current pump such as that described in the discussions related to FIGS. 1 and 3, and may be employed as a core pump element in all switching power and wireless charging embodiments disclosed herein. Two flip-flops are shown at the upper left-hand corner of FIG. 5. As part of the feedback controller, these two flip-flops together provide the information necessary to indicate the switching direction (up or down), and just when to switch. The left-hand flip-flop indicates the switching direction, and the right-hand flip-flop provides the necessary switch timing at the zero-crossing of the tank current. In FIG. 5, the elements connected to the gates of the MOSFETs are gate drivers chosen to provide sufficient voltage to drive the MOSFETS. The circuitry at the top of FIG. 5 is the tank current integrating amplifier of FIG. 4, which reflects the tank current. The cluster of amplifiers and gates at the lower left portion of FIG. 5 acts as the summing amplifier of FIG. 4, and the voltage source shown at the very lower left of FIG. 5 ("CURRENT CONTROL INPUT") acts as an external control input to set a reference level for the desired output current.

Figure 7B:
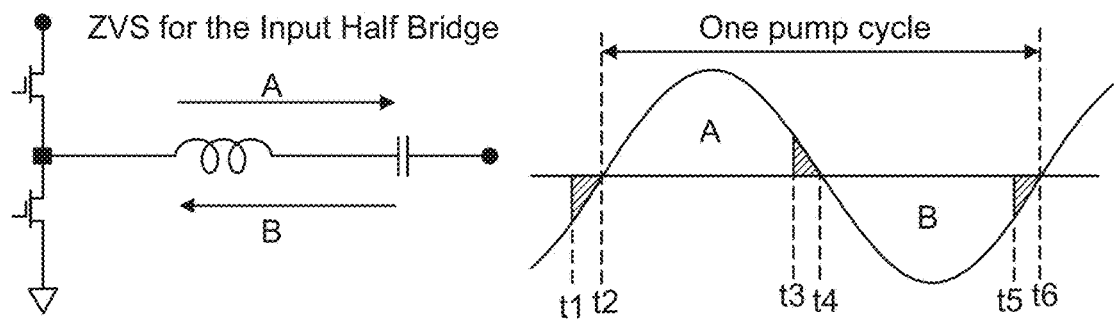
Figure 7C:
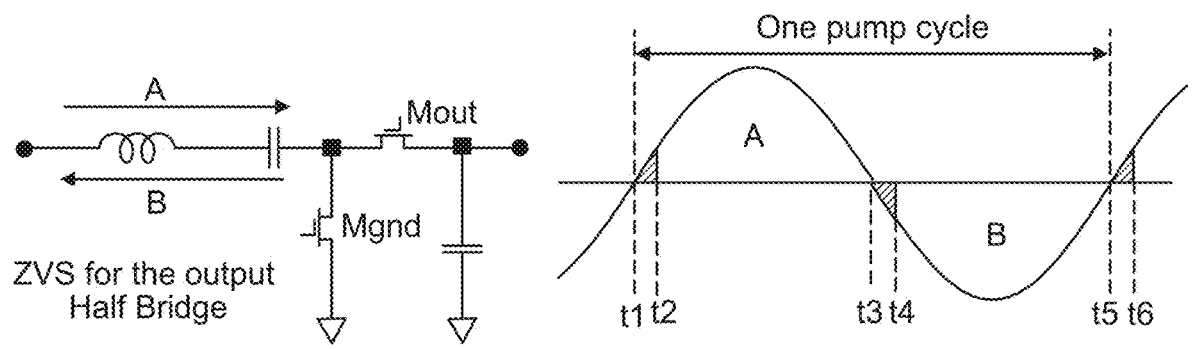

The idealized circuit diagrams of FIG. 6A through 6C will be used, in conjunction with the diagrams of FIG. 7A through 7C to illustrate the operation of conventional (FIGS. 6A and 6B) and example embodiments of converters in accordance with principles of inventive concepts (FIGS. 6C and 6D).

FIG. 6A is a simplified schematic of a traditional "buck" DC to DC converter having an LC filter and two idealized switches S1 and S2 (representing switching transistors). The LC filter is not used in resonant mode in a traditional "buck" DC to DC converter.

FIG. 6B is a simplified schematic of a traditional "buck" or "boost" DC to DC converter with an LC filter and four idealized switches S1, S2, S3, S4. The LC filter is not used in resonant mode in a traditional "buck" or "boost" DC to DC converter.

FIG. 6C is a simplified schematic of an example embodiment of a buck or boost DC-to-DC converter in accordance with principles of inventive concepts. Unlike a conventional converter, it is a single-phase resonant (also referred to herein as a fixed frequency resonant) buck or boost DC-to-DC converter with four idealized switches S1, S2, S3, S4 and a resonant LC tank, in accordance with principles of the present invention. The example embodiment of FIG. 11 is a more detailed schematic of a fixed frequency resonant buck or boost DC-to-DC converter in accordance with principles of inventive concepts.

FIG. 6D is a simplified schematic of an example embodiment of a buck converter in accordance with principles of inventive concepts. In example embodiments the dual-phase resonant frequency buck converter includes six idealized switches S1, S2, S3, S4, S5 and S6 and a resonant LC tank.

Conventional converters (e.g., FIGS. 6A and 6B) feature an input inductor feeding current to an output capacitor connected across the load. These converters commonly employ pulse-width modulation to provide a desired DC output. In example embodiments a fixed frequency resonant buck or boost converter, with a series resonant LC feeding an output capacitor connected across the load operates at, and tracks, the resonant frequency of the LC circuit. In example embodiments, a power converter in accordance with principles of inventive concepts operates at the resonant frequency of the LC circuit despite any circuit changes attributable to environmental, age, or other mechanisms by tracking the LC circuit's resonant frequency. As will be described in greater detail herein, a basic architecture in accordance with principles of the present invention includes a series resonant LC tank operated at the tank's resonant frequency that, with various configurations, may instantiate a wireless/resonant charger, a buck converter, buck/boost converter or other switching power converter.

Figure 11:
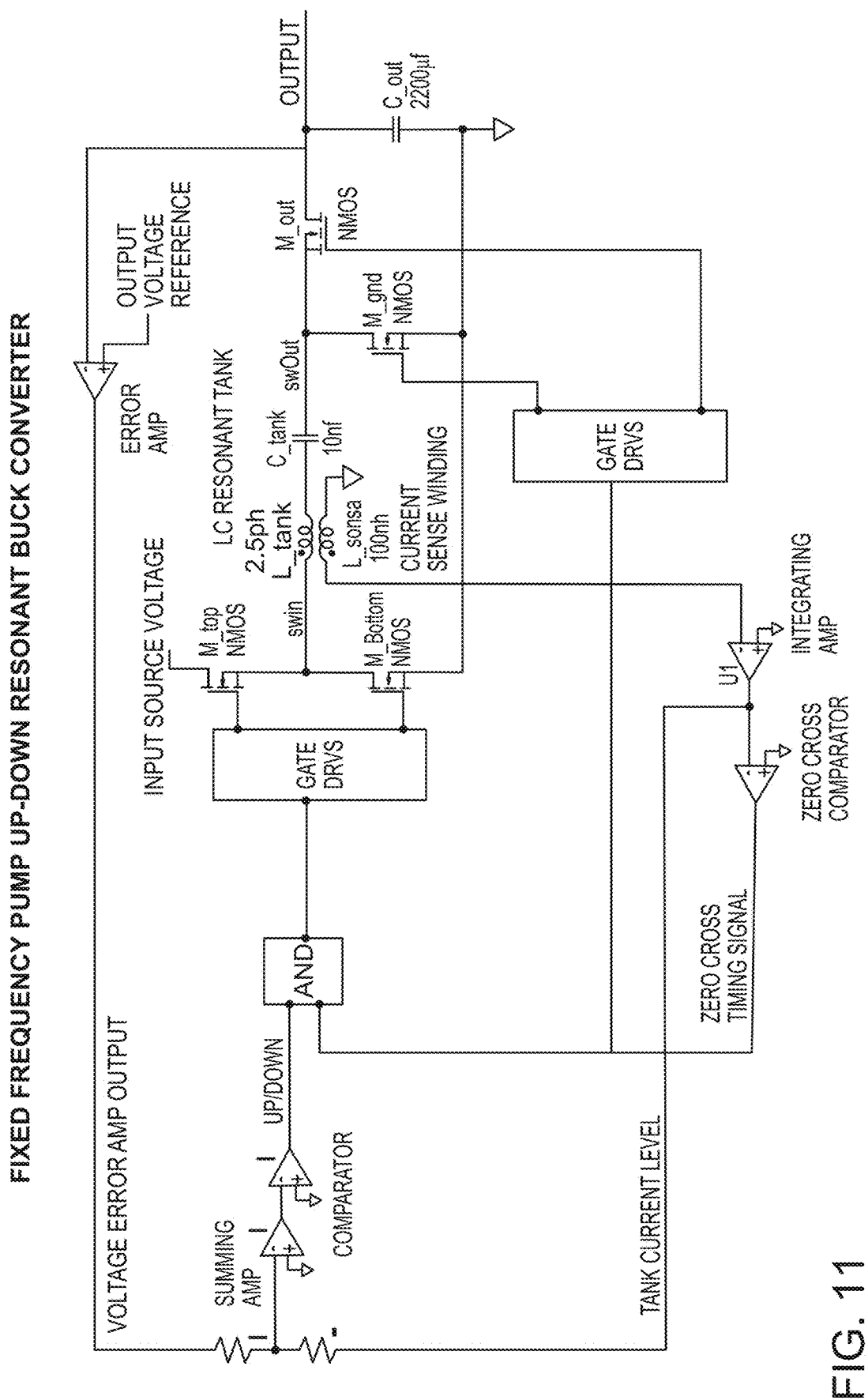
FIG. 11 is a circuit diagram of a fixed frequency pump up-down resonant buck converter in accordance with principles of inventive concepts.

FIGS. 7A, 7B and 7C illustrate LC tank current flows during half-cycles A and B for both "pumping up" and "pumping down" operations for an example embodiment of the four-transistor resonant frequency buck converter of FIGS. 6C and 11 in accordance with principles of inventive concepts. Referring to FIG. 7A, by convention the tank current flows from left to right (input to output) in the series LC network for the positive excursion of the current waveform, and the tank current flows from right to left during the commutation ("negative") half of the cycle. During the positive half-cycle, the tank current is delivered through an output MOSFET to the output. MOSFETs are shown as open or closed switches in FIGS. 7A, 7B and 7C. For the negative, relaxation, half of the sine wave during pumping up, the bottom MOSFETs for both the input half bridge and the output half bridge are turned on, thereby providing a return path for the current (in this example embodiment of a single-phase resonant buck converter).

For a pump-up cycle, the tank current is sourced through the top input MOSFET. For the relaxation half of the cycle during pumping up, both bottom MOSFETs are turned on, while the top input MOSFET and the output MOSFET are turned off. For a pump-down cycle, the tank current is sourced through the input bottom MOSFET. For the relaxation half of the cycle during pumping down, the top input MOSFET and the output MOSFET are turned on, while the other two MOSFETs are turned off.

Referring now to the example embodiment of FIG. 7B, zero voltage switching for the input half bridge (the current pump half bridge previously discussed) in accordance with principles of inventive concepts is described. Just before the positive-going zero-crossing, the tank current is flowing right to left ahead of the zero-crossing, and the bottom MOSFET is on. A short time (e.g., 10 ns-200 ns) before the zero-crossing, the bottom MOSFET turns off, causing the tank current to push the input switching node to the positive reference voltage, where the node voltage is clamped by the body diode of the top MOSFET and prevented from rising further. At the zero-crossing, the switching node has been driven to rail voltage of the top MOSFET by the tank inductor. At that moment, the top MOSFET turns on, with little or no voltage across it, thereby achieving zero voltage switching for the top input MOSFET. Just before the negative-going zero-crossing, the tank current is flowing left-to right, and the top MOSFET is on. Similarly, a short time before the zero-crossing, the top MOSFET turns off, allowing the tank inductor to push down the switching node voltage to be caught by the body diode of the bottom input MOSFET. At the zero-crossing, the bottom MOSFET turns on, achieving zero voltage switching for the bottom input MOSFET. To summarize:

Pumping Up:
   At t1, bottom input MOSFET turns off,
   At t2, top input MOSFET turns on,
   At t3, top input MOSFET turns off,
   At t4, bottom input MOSFET turns on,
   At t5, bottom input MOSFET turns off,
   At t6, to input MOSFET turns on.
Pumping Down:
   The top input MOSFET stays off for pump-down cycles,
   The bottom input MOSFET stays on for pump-down cycles.

In the example embodiment of FIG. 7C, zero voltage switching for the output half bridge of a buck converter will be described. Just before the positive-going zero crossing of the tank current waveform, the bottom output MOSFET Mgnd is on, and the output MOSFET Mout is off. At the zero-crossing, Mgnd turns off, allowing the tank current to push the voltage of the output switching node up until that node voltage is clamped by the body diode of the output MOSFET Mout. A short time later, Mout turns on, with no voltage across it (other than the drop of its body diode), achieving zero voltage switching for the Mout MOSFET. Similarly, just before the negative-going zero-crossing of the tank waveform, the output MOSFET Mout is on, and Mgnd is off. At the zero-crossing, Mout turns off, allowing the tank current to push the voltage of the output switching node down to be clamped by the body diode of MOSFET Mgnd. A short time later, Mgnd turns on, achieving zero voltage switching for the Mgnd MOSFET. In summary:

For Both Pumping Up and Pumping Down:
   At t1, Mgnd turns off,
   At t2, Mout turns on,
   At t3, Mout turns off,
   At t4, Mgnd turns on,
   At t5, Mgnd turns off,
   At t6, Mout turns on.

Figure 8:
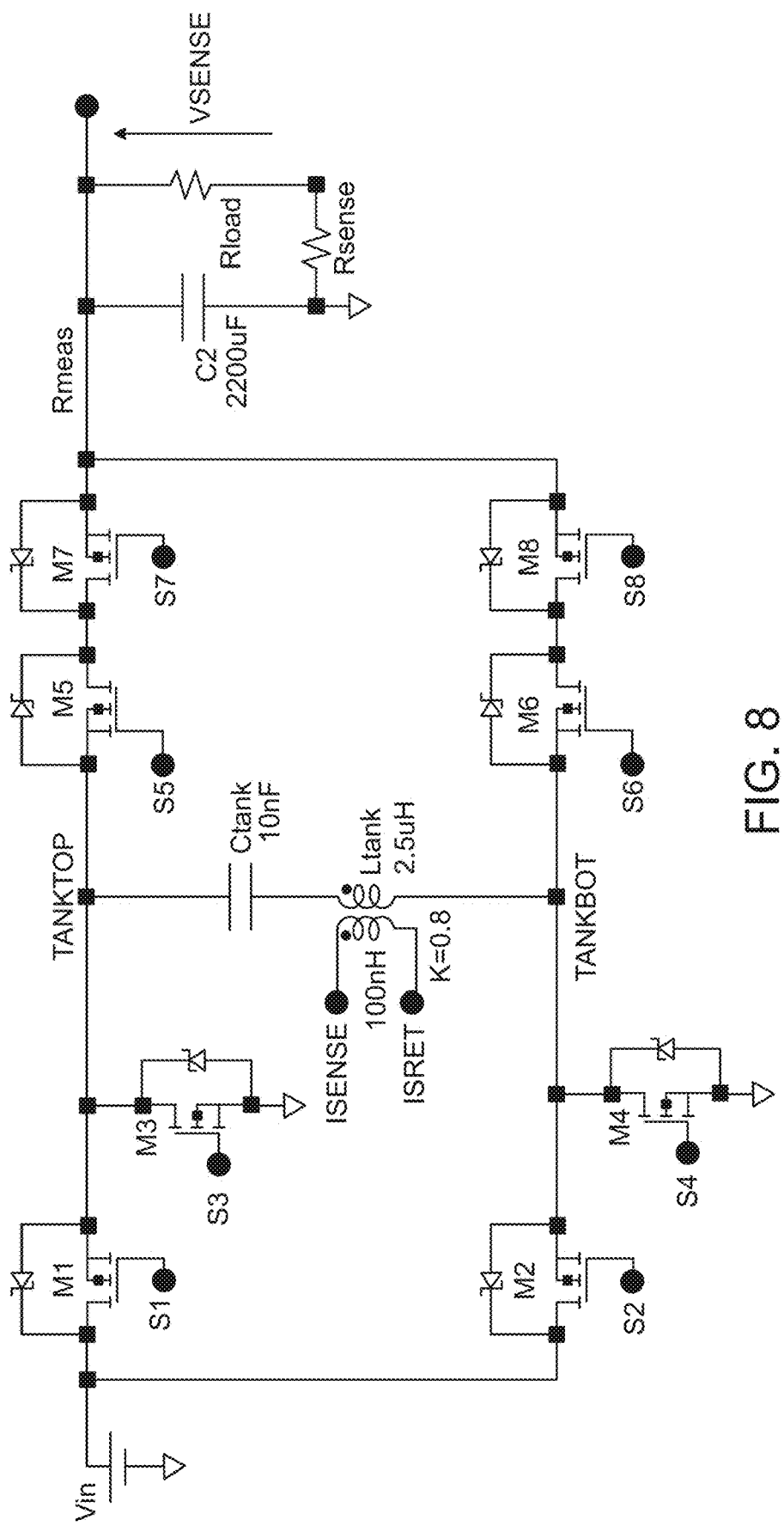
FIG. 8 is a schematic diagram of an example embodiment of a Buck Dual-Phase DC-DC converter with zero-voltage switching (ZVS) and zero-current switching (ZCS) in accordance with principles of inventive concepts.
Figure 9:
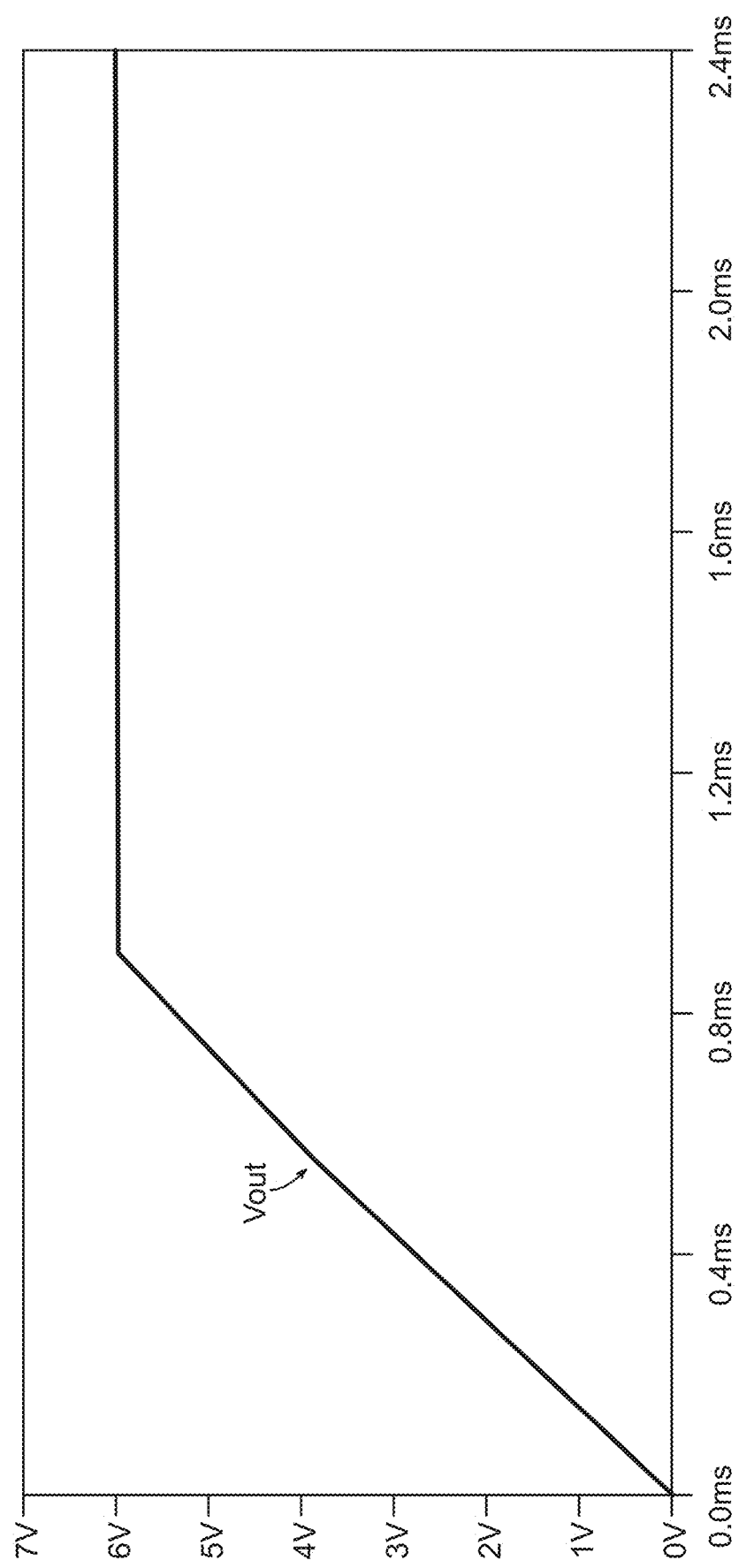
FIG. 9 illustrates the behavior of the output voltage waveform for the power converter of FIG. 8 when started from a condition of zero volts and zero amps in the tank circuit.

FIG. 8 is a schematic diagram of an example embodiment of a Buck Dual-Phase DC-DC converter with zero-voltage switching (ZVS) and zero-current switching (ZCS) in accordance with principles of inventive concepts. The feedback controller is shown in greater detail in the example embodiment of FIG. 12. FIG. 9 illustrates the behavior of the output voltage waveform for the power converter of FIG. 8 when started from a condition of zero volts and zero amps in the tank circuit. As a result of the regulating action of the feedback controller, the output voltage rises from zero to the desired steady-state final voltage level of 6V.

In the example embodiment of FIG. 8 switches M1, M3, M2 and M4 (power MOSFETs, for example) correspond to switches S1, S2, S5 and S3 of FIG. 6D respectively. Switches M5 and M7 (power MOSFETs, for example) of FIG. 8 are connected in series with reverse-polarity to provide for bidirectional power flow. Together switches M5 and M7 correspond to switch S6 of FIG. 6D. Switches M6 and M8 (power MOSFETs, for example) of FIG. 8 provide for bidirectional power flow and correspond to switch S4 of FIG. 6D. Current- and voltage-sensing signals ISENSE, ISRET and VSENSE emanate from the circuitry shown in FIG. 8 and act as input signals to the controller circuitry of FIG. 12. The circuitry of FIG. 12 produces gate drive signals S1, S2, S3, S4, S5 and S6 for the MOSFET switches M1, M2, M3, M4, M5, M6, M7 and M8 of FIG. 8.

Figure 12:
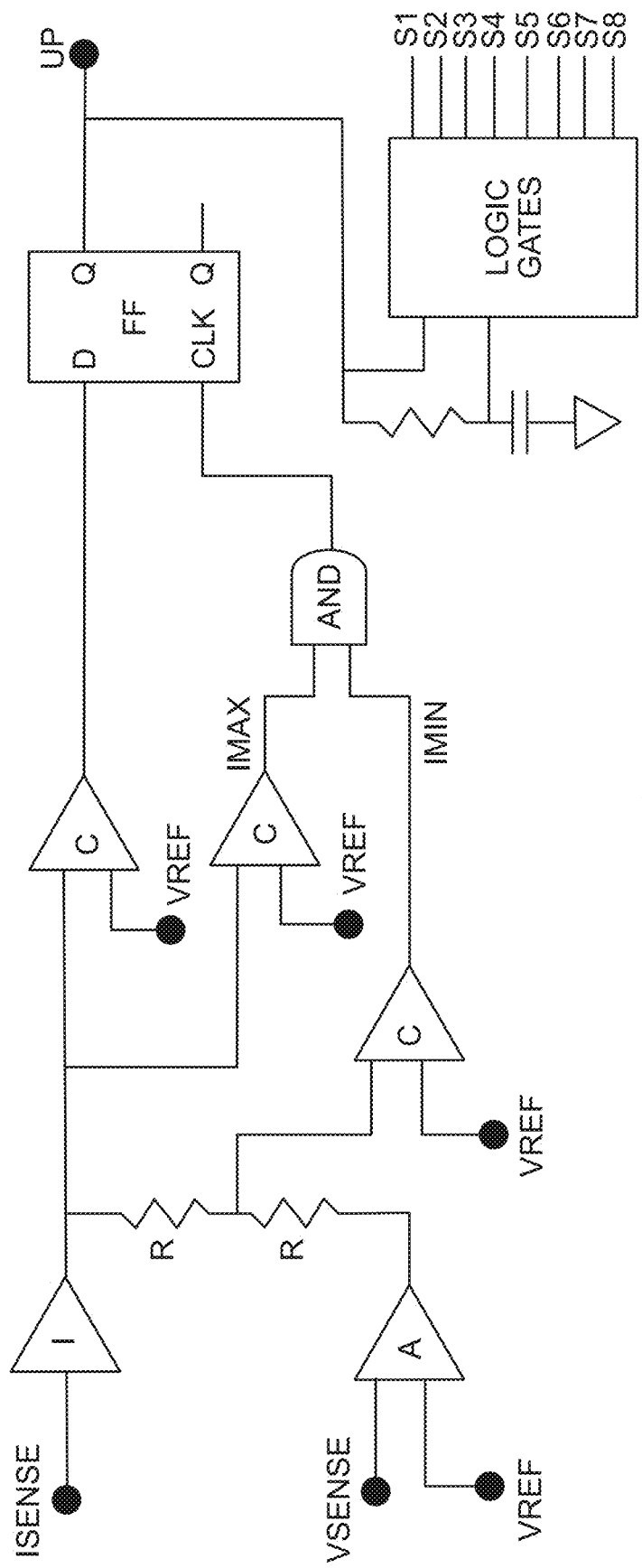
FIG. 12 is a circuit diagram of example embodiment of a feedback control circuit in accordance with principles of inventive concepts, such as may be employed in a power converter in accordance with principles of inventive concepts.

An example embodiment of a feedback control circuit in accordance with principles of inventive concepts, such as may be employed in a power converter in accordance with principles of inventive concepts is illustrated in the circuit diagram of FIG. 12. In FIG. 12, the integrator is identified by the letter "I" within a triangular shape. Similarly, an operational amplifier is identified by the letter "A", and the comparators are identified by the letter "C". The circuitry of FIG. 12 operates in a manner similar to that described above with regard to FIG. 3. The flip-flop FF shown at the upper right-hand corner of FIG. 12 produces a signal UP, which represents the binary state of the system, i.e., pumping up or pumping down. Signal UP and a delayed version of it feed a logic block comprising only OR gates, AND gates and R-S flip-flops, thereby producing signals S1, S2, S3, S4, S5 and S6. The feedback controller circuitry of FIG. 12 does not contain an independent oscillator, instead producing the necessary gate drive signals in response to the current and voltage signals emanating from the power-handling circuitry of FIG. 8.

Figure 10A:
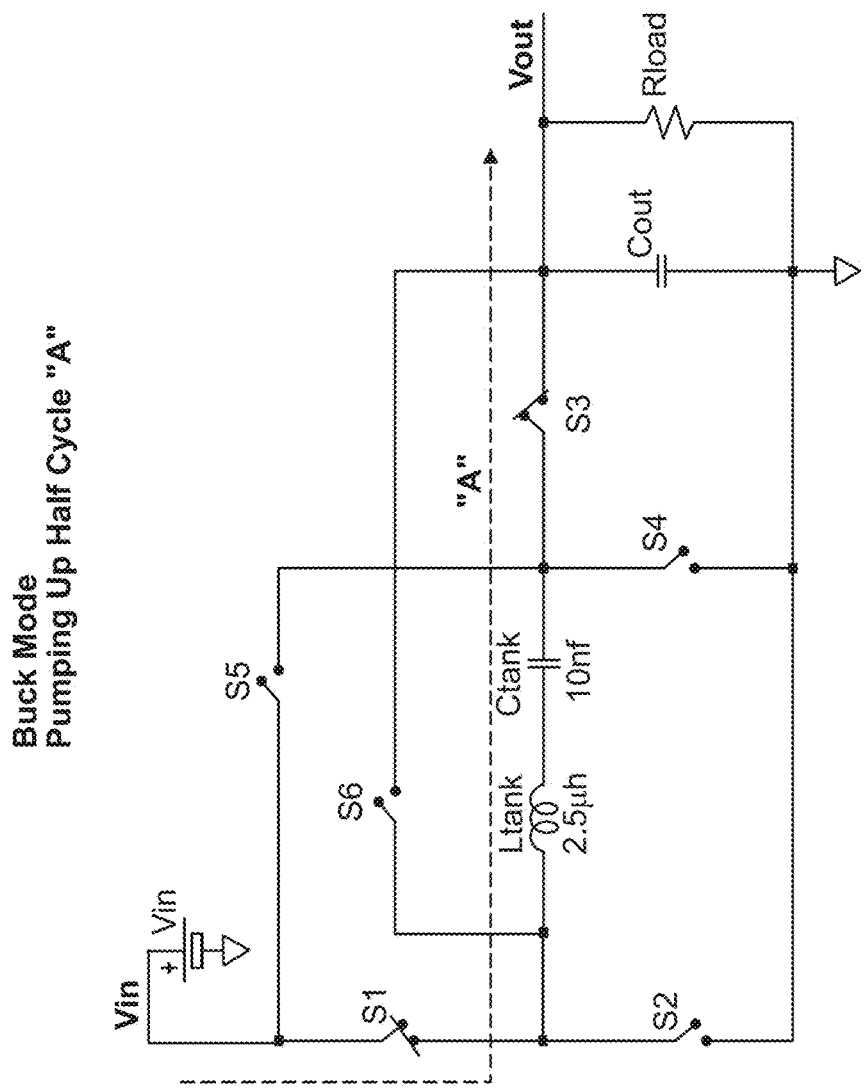
Figure 10A:
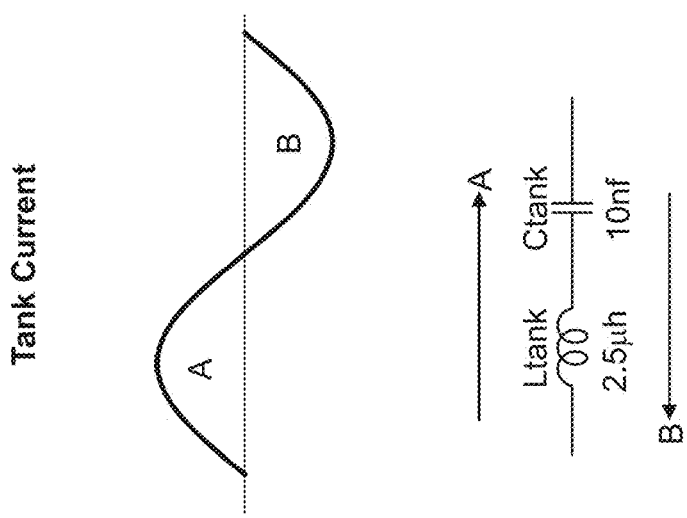
Figure 10B:
Figure 10B:
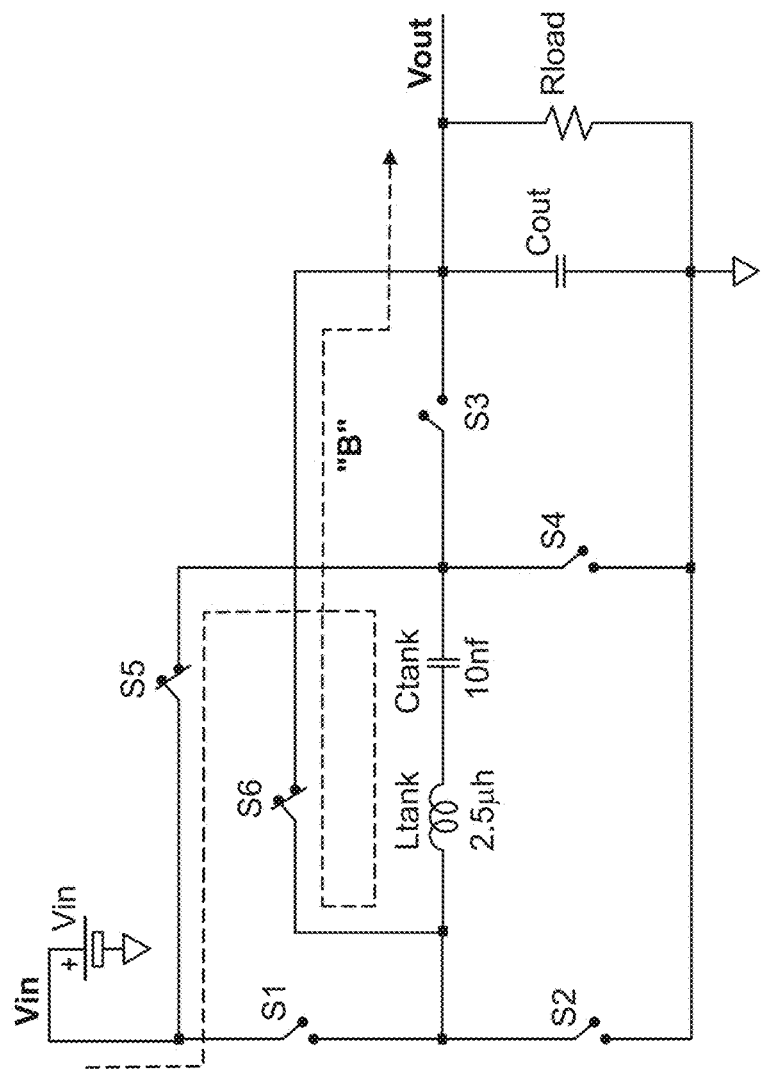
Figure 10B:
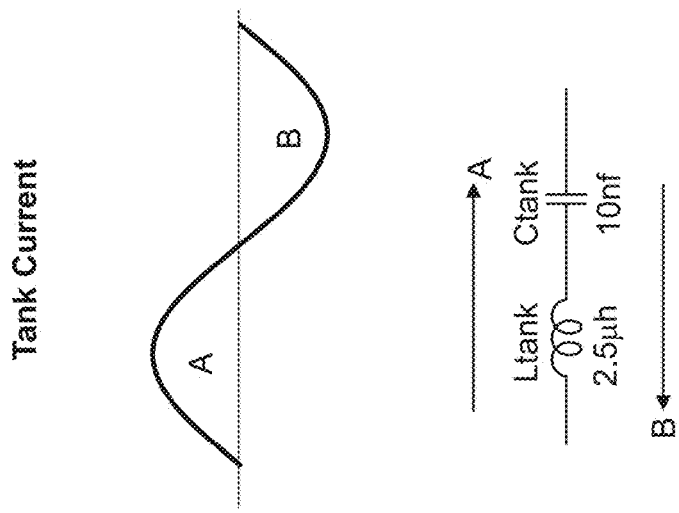
Figure 10D:
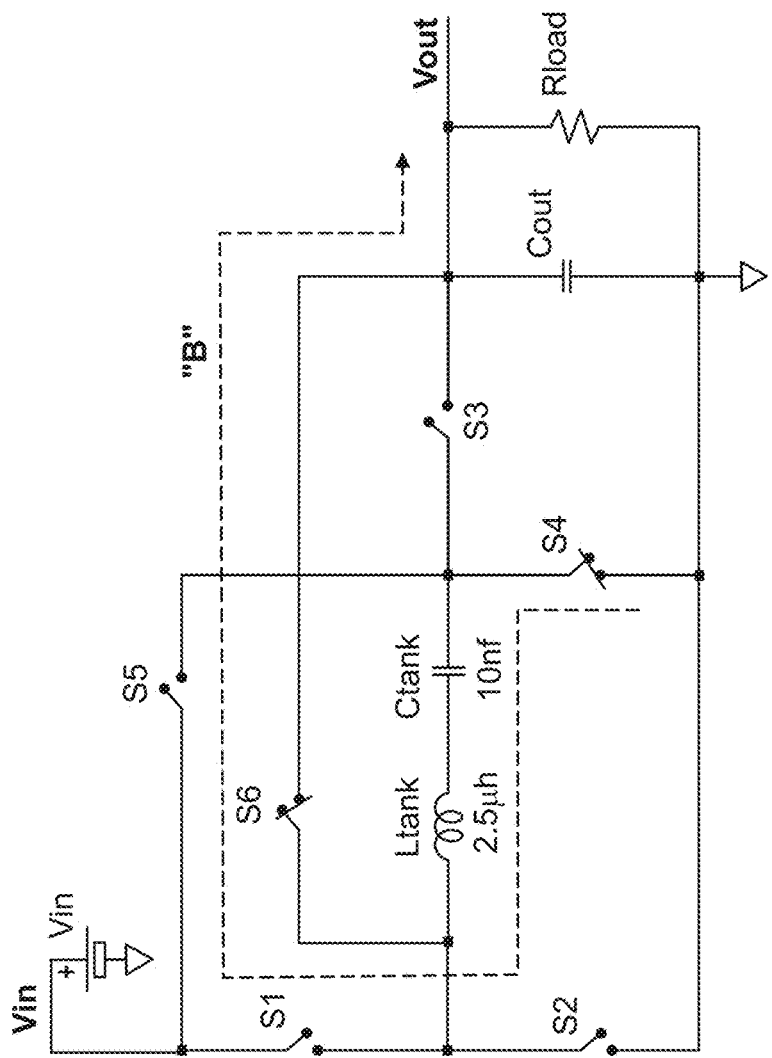
Figure 10D:
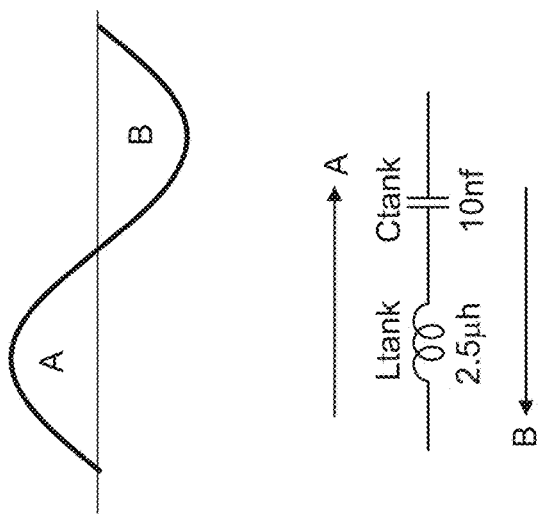

FIGS. 10A, 10B, 10C, and 10D depict power path flow diagrams for the six-transistor dual-phase resonant fixed frequency buck converter of FIGS. 6D and 8. In FIG. 10A the converter is pumping up and the switch positions correspond to the "A" half-cycle (tank current magnitude and direction illustrated in the "sidebars" to the left of the figure). In FIG. 10B the converter is pumping up and the switch positions correspond to the "B" half-cycle (tank current magnitude and direction illustrated in the "sidebars" to the left of the figure). In FIG. 10C the converter is pumping down and the switch positions correspond to the "A" half-cycle (tank current magnitude and direction illustrated in the "sidebars" to the left of the figure). In FIG. 10D the converter is pumping down and the switch positions correspond to the "B" half-cycle (tank current magnitude and direction illustrated in the "sidebars" to the left of the figure). In example embodiments the circuit configurations of FIGS. 10A through 10D may be operated as a resonant boost converter with a controller configured to open and close a different combination of switches for each half-cycle, thereby redirecting the dashed-line current flows.

As noted above, DC-DC converters in accordance with principles of inventive concepts may be implemented as bidirectional power converters capable of transmitting power from a source to a load or vice versa. This applies to converters of the types shown in FIGS. 6C and 6D, for example. For reverse power flow (i.e., power flow from the "load" side to the "source" side), the feedback controller is arranged to regulate the voltage on the source side, rather than on the load side. In addition to regulation of delivered voltage, by employing a current-averaging circuit (such as an R-C filter), both types of system can be configured to regulate the average flow of current delivered (in either direction).

In FIGS. 10A through 10D the "sidebars" include a sine wave that represents the tank current, with the top half-wave labeled "A" and the bottom half-wave labeled "B." By convention, during the "A" half-wave the current is flowing left-to-right through the tank inductor (and capacitor) and, during the "B" half-wave, the current is flowing right-to-left through the inductor (and capacitor).

Referring to the diagram "sidebars," a single-phase (four-transistor) resonant buck converter delivers current to a load only during the "A" half-phase of the cycle (half-wave rectification), and current is returned to ground during the "B" half-phase (or half-cycle). Although returning current to ground during this half-cycle does not contribute to significant power losses, current is supplied to the load only during the "A" half-cycle. As a result, the root mean square (RMS) tank current must be higher to achieve the same average output current. In contrast, a dual-phase (six-transistor) embodiment delivers current to the output on both "A" and "B" half-cycles (full-wave rectification) and therefore requires only half the RMS tank current to deliver the same average load as a single-phase implementation.

In example embodiments, circuit current and voltage feedback may be performed every cycle, every half-cycle, or every n-cycles, and the feedback may be employed in accordance with principles of the present invention to provide pumping up or down. Although half-cycle feedback is more complicated than cycle-by-cycle feedback, it provides improved frequency response. In example embodiments in accordance with principles of the present invention, feedback from the tank is employed to determine the switch configuration of a converter for a given cycle (or half-cycle) given the output voltage and load requirements.

FIG. 11 is a circuit diagram of a fixed frequency pump up-down resonant buck converter in accordance with principles of inventive concepts. In this example embodiment the converter employs a basic resonant tank circuit as described in the discussion related to FIG. 3 and FIG. 4.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

Below follows an itemized list of statements describing embodiments in accordance with the inventive concepts:

1. A power converter, comprising:
   an input to receive power;
   an LC tank circuit;
   a switching circuit to switch power from the input to the LC tank circuit; and
   a feedback circuit to control the switching circuit to switch at the LC tank circuit's resonant frequency.
2. The power converter of statement 1, or any other statement or combination of statements, wherein the feedback circuit is configured to control switching according to the phase of the LC tank circuit's output.
3. The power converter of statement 2, or any other statement or combination of statements, wherein the feedback circuit includes a secondary coil configured to sense the phase of the LC tank circuit.

4. The power converter of statement 1, or any other statement or combination of statements, wherein the feedback circuit is configured to produce zero voltage switching.

5. The power converter of statement 1, or any other statement or combination of statements, wherein the feedback circuit is configured to produce zero current switching.

6. The power converter of statement 1, or any other statement or combination of statements, wherein the feedback circuit is configured to produce zero voltage switching.

7. The power converter of statement 1, further comprising an inverting circuit.

8. The power converter of statement 7, or any other statement or combination of statements, wherein the converter is configured as a DC-to-DC converter.

9. The power converter of statement 1, or any other statement or combination of statements, wherein the power converter further comprises a secondary coil and is configured as a charger.

10. The power converter of statement 1, or any other statement or combination of statements, wherein the converter is configured as a buck converter.

11. The power converter of statement 1, or any other statement or combination of statements, wherein the converter is configured as a buck-boost converter.

12. The power converter of statement 1, or any other statement or combination of statements, wherein the converter is configured as a bidirectional converter.

13. A method of operating an electronic power converter, comprising:

providing an input power source to the converter;

providing an LC tank circuit;

providing a switching circuit to switch power from the input power source to the LC tank circuit; and providing a feedback circuit to control the switching circuit to switch power at the LC tank circuit's resonant frequency.

14. The method of statement 13, or any other statement or combination of statements, wherein the feedback circuit controls switching according to the phase of the LC tank circuit's output.

15. The method of statement 14, or any other statement or combination of statements, wherein the feedback circuit includes a secondary coil that senses the phase of the LC tank circuit.

16. The method of statement 13, or any other statement or combination of statements, wherein the feedback circuit produces zero voltage switching.

17. The method of statement 13, or any other statement or combination of statements, wherein the feedback circuit produces zero current switching.

18. The method of statement 17, or any other statement or combination of statements, wherein the feedback circuit produces zero voltage switching.

19. An electronic power converter, comprising an input to receive power;

an LC tank circuit;

a switching circuit to switch power from the input to the LC tank circuit; and a feedback circuit to control the switching circuit according to the phase of the LC tank circuit's output to switch at the LC tank circuit's resonant frequency and to produce zero voltage and zero current switching.

20 The electronic power converter of statement 19, or any other statement or combination of statements, further comprising an inverting circuit configured to produce a DC output from the power converter.

21. An apparatus, comprising:

an LC tank circuit comprising an inductor and a capacitor connected in series;

a switching circuit to drive the LC tank circuit; and a feedback controller to sense a characteristic of the LC tank circuit and to drive the switching circuit, wherein the whole apparatus oscillates of its own accord at the natural frequency of the LC tank circuit.

22. The apparatus of statement 21, or any other statement or combination of statements, wherein the characteristic of the LC tank circuit is the phase of the current flowing in the LC tank circuit.

23. The apparatus of statement 22, or any other statement or combination of statements, wherein the feedback controller comprises a current sensing circuit comprising a secondary winding on the inductor together with an integrator.

24. The apparatus of statement 21, or any other statement or combination of statements, wherein the amplitude of the oscillation in the LC tank circuit can be pumped up or down by the feedback controller.

25. The apparatus of statement 24, or any other statement or combination of statements, wherein the feedback controller drives the switching circuit to facilitate zero-current switching or zero-voltage switching or both.

26. The apparatus of statement 21, or any other statement or combination of statements, wherein the feedback controller drives the switching circuit to facilitate zero-current switching or zero-voltage switching or both.

27. A method, comprising:

driving a series resonant LC tank circuit with a switching circuit; and driving the switching circuit with a feedback controller adapted to sense the phase of the current flowing in the LC tank circuit;

whereby the LC tank circuit, switching circuit, and feedback controller together oscillate as a composite at the natural frequency of the LC tank circuit.

28. The method of statement 27, or any other statement or combination of statements, wherein the amplitude of the oscillation in the LC tank circuit can be pumped up or down by the feedback controller.

29. The method of statement 28, or any other statement or combination of statements, wherein the feedback controller drives the switching circuit to facilitate zero-current switching or zero-voltage switching or both.

30. The method of statement 27, or any other statement or combination of statements, wherein the feedback controller drives the switching circuit to facilitate zero-current switching or zero-voltage switching or both.

31. The method of statement 27, or any other statement or combination of statements, wherein the phase of the current flowing in the LC tank circuit is produced by way of a secondary winding on the inductor together with an integrator.

32. An apparatus, comprising:

an LC tank circuit comprising an inductor and a capacitor connected in series;

a switching circuit to drive the LC tank circuit;

a feedback controller to drive the switching circuit;

a feedback circuit to sense a characteristic of the LC tank circuit and to drive the switching circuit;

wherein the LC tank circuit, switching circuit, and feedback controller together oscillate as a composite at the natural frequency of the LC tank circuit; and an output switching circuit to provide a direct current voltage output.

33. The apparatus of statement 32, or any other statement or combination of statements, wherein the apparatus is capable of providing power flow in either direction between the DC source and the DC load.

34. A method, comprising:
driving a series resonant LC tank circuit with a switching circuit;
driving the switching circuit with a feedback controller adapted to sense the phase of the current flowing in the LC tank circuit;
wherein the LC tank circuit, switching circuit, and feedback controller together oscillate as a composite at the natural frequency of the LC tank circuit; and
driving an output switching circuit to provide a direct current output voltage.

35. The method of statement 34, or any other statement or combination of statements, also providing power flow in either direction between the DC source and the DC load.

36. An apparatus, comprising:
an LC tank circuit comprising an inductor and a capacitor connected in series;
a switching circuit to drive the LC tank circuit;
a feedback controller to drive the switching circuit;
a feedback circuit to sense a characteristic of the LC tank circuit;
wherein the LC tank circuit, switching circuit, and feedback controller together oscillate as a composite at the natural frequency of the LC tank circuit; and
an interface configured to drive a secondary coil and rectification circuit to charge a power source.

37. A method, comprising:
driving a series resonant LC tank circuit with a switching circuit;
driving the switching circuit with a feedback controller adapted to sense the phase of the current flowing in LC tank circuit;
wherein the LC tank circuit, switching circuit, and feedback controller together oscillate as a composite at the natural frequency of the LC tank circuit; and
driving a secondary coil and rectification circuit to charge a power source.

38. A method, comprising:
driving a series resonant LC tank circuit with a switching circuit; and
driving the switching circuit with a feedback controller adapted to sense a characteristic of the LC tank circuit;
whereby the LC tank circuit, switching circuit, and feedback controller together oscillate as a composite at the natural frequency of the LC tank circuit.

What is claimed is:

1. A power converter, comprising:
an LC tank circuit characterized by a natural frequency comprising an inductor and a capacitor connected in series;
a switching circuit to drive the LC tank circuit; and
a feedback controller to sense a characteristic of the LC tank circuit and to drive the switching circuit, wherein the feedback controller is configured to pump an amplitude of an oscillation in the LC tank circuit up or down, wherein the feedback controller is configured to track the natural frequency of the LC tank circuit and to initiate and maintain operation of the power converter at the natural frequency of the LC tank circuit.

2. The power converter of claim 1, wherein the characteristic of the LC tank circuit is a phase of a current flowing in the LC tank circuit.

3. The power converter of claim 2, wherein the feedback controller comprises a current sensing circuit comprising a secondary winding on the inductor together with an integrator.

4. The power converter of claim 1, wherein the feedback controller drives the switching circuit to facilitate zero-current switching or zero-voltage switching or both.

5. The power converter of claim 1, wherein the feedback controller drives the switching circuit to facilitate zero-current switching or zero-voltage switching or both.

6. A method in a power converter, comprising:
driving a series resonant LC tank circuit characterized by a natural frequency with a switching circuit; and
driving the switching circuit with a feedback controller adapted to sense a phase of a current flowing in the LC tank circuit, wherein the feedback controller tracks the natural frequency of the LC tank circuit and initiates and maintains operation of the power converter at the natural frequency of the LC tank circuit.

7. The method of claim 6, wherein an amplitude of an oscillation in the LC tank circuit can be pumped up or down by the feedback controller.

8. The method of claim 7, wherein the feedback controller drives the switching circuit to facilitate zero-current switching or zero-voltage switching or both.

9. The method of claim 6, wherein the feedback controller drives the switching circuit to facilitate zero-current switching or zero-voltage switching or both.

10. The method of claim 6, wherein the phase of the current flowing in the LC tank circuit is produced by way of a secondary winding on an inductor together with an integrator.

11. A power converter, comprising:
an LC tank circuit characterized by a natural frequency comprising an inductor and a capacitor connected in series;
a switching circuit to drive the LC tank circuit;
a feedback circuit to sense a characteristic of the LC tank circuit and to drive the switching circuit;
wherein the feedback circuit is configured to track the natural frequency of the LC tank circuit, and to initiate and maintain operation of the power converter at the natural frequency of the LC tank circuit, and to provide zero current and zero voltage switching; and
an output switching circuit to provide a direct current voltage output.

12. The power converter of claim 11, further configured to provide power flow in either direction between a DC source and a DC load.

13. A power converter, comprising:
a switching circuit configured to drive a series resonant LC tank circuit characterized by a natural frequency; and
a feedback controller adapted to sense a characteristic of the LC tank circuit configured to drive the switching circuit, wherein the feedback controller is configured to track the natural frequency of the LC tank circuit and to initiate and maintain operation of the power converter as a composite at the natural frequency of the LC tank circuit and the switching circuit and feedback controller operate without an independently oscillating clock.

14. The power converter of claim 13, wherein the power converter provides power flow in either direction between a DC source and a DC load.

15. A power converter, comprising:
an LC tank circuit characterized by a natural frequency comprising an inductor and a capacitor connected in series;
a switching circuit to drive the LC tank circuit;
a feedback controller to drive the switching circuit;
a feedback circuit to sense a characteristic of the LC tank circuit, wherein the feedback controller tracks the natural frequency of the LC tank circuit and initiates and maintains operation of the power converter as a composite at the natural frequency of the LC tank circuit and the switching circuit and feedback controller operate without an independently oscillating clock; and
an interface configured to drive a secondary coil and rectification circuit to charge a power source.

16. A method in a power converter, comprising:
driving a series resonant LC tank circuit characterized by a natural frequency with a switching circuit;
driving the switching circuit with a feedback controller adapted to sense a phase of a current flowing in the LC tank circuit;
wherein the feedback controller tracks the natural frequency of the LC tank circuit and initiates and maintains operation of the power converter as a composite at the natural frequency of the LC tank circuit and the switching circuit and feedback controller operate without an independently oscillating clock; and
driving a secondary coil and rectification circuit to charge a power source.

17. A method in a power converter, comprising:
driving a series resonant LC tank circuit characterized by a natural frequency with a switching circuit; and
driving the switching circuit with a feedback controller adapted to sense a characteristic of the LC tank circuit; wherein the feedback controller tracks the natural frequency of the LC tank circuit and initiates and maintains operation of the power converter as a composite at the natural frequency of the LC tank circuit and the switching circuit and feedback controller operate without an independently oscillating clock.

* * * * *